(12) United States Patent
Diosi et al.

(10) Patent No.: US 8,016,708 B2
(45) Date of Patent: Sep. 13, 2011

(54) MULTI-SPEED GEARBOX

(75) Inventors: Gabor Diosi, Friedrichshafen (DE); Josef Haupt, Tettnang (DE); Gerhard Gumpoltsberger, Friedrichshafen (DE); Peter Ziemer, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 903 days.

(21) Appl. No.: 11/995,053

(22) PCT Filed: Jul. 4, 2006

(86) PCT No.: PCT/EP2006/006475
§ 371 (c)(1),
(2), (4) Date: Jan. 8, 2008

(87) PCT Pub. No.: WO2007/006449
PCT Pub. Date: Jan. 18, 2007

(65) Prior Publication Data
US 2008/0234093 A1 Sep. 25, 2008

(30) Foreign Application Priority Data
Jul. 8, 2005 (DE) .......... 10 2005 032 001

(51) Int. Cl.
*F16H 3/62* (2006.01)
(52) U.S. Cl. ........ 475/276; 475/277; 475/282; 475/296; 475/330

(58) Field of Classification Search ............... 475/269, 475/275, 277, 282, 296, 330
See application file for complete search history.

(56) References Cited

U.S. PATENT DOCUMENTS

| 4,683,776 | A | 8/1987 | Klemen |
| 6,176,803 | B1 | 1/2001 | Meyer et al. |
| 6,634,980 | B1 | 10/2003 | Ziemer |
| 6,960,149 | B2 | 11/2005 | Ziemer |
| 7,014,589 | B2 | 3/2006 | Stevenson |
| 7,018,319 | B2 | 3/2006 | Ziemer |
| 2010/0048344 | A1* | 2/2010 | Kamm et al. ............ 475/275 |

FOREIGN PATENT DOCUMENTS

| DE | 33 41 217 A1 | 5/1985 |
| DE | 43 34 572 A1 | 4/1994 |
| DE | 199 49 507 A1 | 4/2001 |
| DE | 100 83 202 T1 | 1/2002 |
| DE | 101 15 983 A1 | 10/2002 |
| DE | 101 15 995 A1 | 10/2002 |
| DE | 10 2004 029 952 A1 | 1/2005 |
| DE | 10 2005 002 337 A1 | 8/2006 |
| DE | 102006016189 | * 10/2007 |
| DE | 102006016190 | * 10/2007 |
| EP | 1 533 543 A2 | 5/2005 |

* cited by examiner

*Primary Examiner* — David D Le
*Assistant Examiner* — Huan Le
(74) *Attorney, Agent, or Firm* — Davis & Bujold, P.L.L.C.

(57) ABSTRACT

An eight-gear transmission comprises an input shaft, an output shaft, four planetary gear sets and five gear shifting elements.

30 Claims, 23 Drawing Sheets

| Gear | BRAKE | | CLUTCH | | | RATIO i | STEP φ |
|---|---|---|---|---|---|---|---|
| | A | B | C | D | E | | |
| 1 | ● | ● | ● | | | 4.699 | 1.555 |
| 2 | ● | ● | | | ● | 3.021 | 1.557 |
| 3 | | ● | ● | | ● | 1.940 | 1.235 |
| 4 | | ● | | ● | ● | 1.571 | 1.231 |
| 5 | | ● | ● | ● | | 1.276 | 1.276 |
| 6 | | | ● | ● | ● | 1.000 | 1.245 |
| 7 | ● | | ● | ● | | 0.803 | 1.250 |
| 8 | ● | | | ● | ● | 0.643 | TOTAL 7.308 |
| R | ● | ● | | ● | | -2.379 | |

Fig. 1A

| Gear | BRAKE | | CLUTCH | | | RATIO i | STEP φ |
|---|---|---|---|---|---|---|---|
| | A | B | C | D | E | | |
| 1 | ● | ● | ● | | | 4.699 | 1.500 |
| 2 | ● | ● | | | ● | 3.134 | 1.463 |
| 3 | | ● | ● | | ● | 2.143 | 1.260 |
| 4 | | ● | | ● | ● | 1.700 | 1.309 |
| 5 | | ● | ● | ● | | 1.298 | 1.298 |
| 6 | | | ● | ● | ● | 1.000 | 1.192 |
| 7 | ● | | ● | ● | | 0.839 | 1.258 |
| 8 | ● | | | ● | ● | 0.667 | TOTAL 7.045 |
| R | ● | ● | | ● | | -3.280 | |

Fig. 2A

| Gear | BRAKE | | CLUTCH | | | RATIO i | STEP φ |
|---|---|---|---|---|---|---|---|
| | A | B | C | D | E | | |
| 1 | ● | ● | ● | | | 4.149 | |
| | | | | | | | 1.454 |
| 2 | ● | ● | | | ● | 2.853 | |
| | | | | | | | 1.386 |
| 3 | | ● | ● | | ● | 2.058 | |
| | | | | | | | 1.243 |
| 4 | | ● | | ● | ● | 1.656 | |
| | | | | | | | 1.293 |
| 5 | | ● | ● | ● | | 1.281 | |
| | | | | | | | 1.281 |
| 6 | | | ● | ● | ● | 1.000 | |
| | | | | | | | 1.182 |
| 7 | ● | | ● | ● | | 0.846 | |
| | | | | | | | 1.230 |
| 8 | ● | | | ● | ● | 0.688 | |
| R | ● | ● | | ● | | -2.544 | TOTAL 6.031 |

Fig. 3A

| Gear | BRAKE | | CLUTCH | | | RATIO i | STEP φ |
|---|---|---|---|---|---|---|---|
| | A | B | C | D | E | | |
| 1 | ● | ● | ● | | | 4.050 | 1.483 |
| 2 | ● | ● | | | ● | 2.731 | 1.331 |
| 3 | | ● | ● | | ● | 2.051 | 1.211 |
| 4 | | ● | | ● | ● | 1.694 | 1.311 |
| 5 | | ● | ● | ● | | 1.292 | 1.292 |
| 6 | | | ● | ● | ● | 1.000 | 1.190 |
| 7 | ● | | ● | ● | | 0.840 | 1.246 |
| 8 | ● | | | ● | ● | 0.674 | TOTAL 6.009 |
| R | ● | ● | | ● | | -2.495 | |

Fig. 4A

| Gear | BRAKE | | CLUTCH | | | RATIO i | STEP φ |
|---|---|---|---|---|---|---|---|
| | A | B | C | D | E | | |
| 1 | ● | ● | ● | | | 4.699 | |
| | | | | | | | 1.484 |
| 2 | ● | ● | | | ● | 3.167 | |
| | | | | | | | 1.474 |
| 3 | | ● | ● | | ● | 2.148 | |
| | | | | | | | 1.271 |
| 4 | | ● | | ● | ● | 1.690 | |
| | | | | | | | 1.344 |
| 5 | | ● | ● | ● | | 1.344 | |
| | | | | | | | 1.232 |
| 6 | | | ● | ● | ● | 1.000 | |
| | | | | | | | 1.205 |
| 7 | ● | | ● | ● | | 0.812 | |
| | | | | | | | 1.258 |
| 8 | ● | | | ● | ● | 0.674 | |
| R | ● | ● | | ● | | -2.043 | TOTAL 6.972 |

Fig. 5A

| Gear | BRAKE | | CLUTCH | | | RATIO i | STEP φ |
|---|---|---|---|---|---|---|---|
| | A | B | C | D | E | | |
| 1 | ● | ● | ● | | | 4.699 | |
| | | | | | | | 1.588 |
| 2 | ● | ● | | | ● | 2.959 | |
| | | | | | | | 1.543 |
| 3 | | ● | ● | | ● | 1.918 | |
| | | | | | | | 1.218 |
| 4 | | ● | | ● | ● | 1.574 | |
| | | | | | | | 1.175 |
| 5 | | ● | ● | ● | | 1.340 | |
| | | | | | | | 1.340 |
| 6 | | | ● | ● | ● | 1.000 | |
| | | | | | | | 1.348 |
| 7 | ● | | ● | ● | | 0.742 | |
| | | | | | | | 1.178 |
| 8 | ● | | | ● | ● | 0.630 | |
| | | | | | | | TOTAL |
| R | ● | ● | | ● | | -0.976 | 7.459 |

Fig. 6A

| Gear | BRAKE | | CLUTCH | | | RATIO i | STEP φ |
|---|---|---|---|---|---|---|---|
| | A | B | C | D | E | | |
| 1 | ● | ● | ● | | | 4.699 | |
| 2 | ● | ● | | | ● | 3.167 | 1.484 |
| 3 | | ● | ● | | ● | 2.148 | 1.474 |
| 4 | | ● | | ● | ● | 1.690 | 1.271 |
| 5 | | ● | ● | ● | | 1.343 | 1.258 |
| 6 | | | ● | ● | ● | 1.000 | 1.343 |
| 7 | ● | | ● | ● | | 0.812 | 1.232 |
| 8 | ● | | | ● | ● | 0.674 | 1.205 |
| R | ● | ● | | ● | | -2.044 | TOTAL 6.972 |

Fig. 7A

MULTI-SPEED GEARBOX

This application is a national stage completion of PCT/EP2006/006475 filed Jul. 4, 2006, which claims priority from German Application Serial No. 10 2005 032 001.5 filed Jul. 8, 2005.

FIELD OF THE INVENTION

The invention relates to a multi-step transmission in planetary design, in particular an automatic transmission for a motor vehicle, comprising an input shaft, an output shaft, four planetary gearsets, at least eight rotatable shafts and five gearshifting elements, whose selective engagement achieves different gear ratios between the input shaft and the output shaft, so that eight forward gears and at least one reverse gear can be realized.

BACKGROUND OF THE INVENTION

According to the prior art, automatic transmissions, particularly for motor vehicles, comprise planetary gearsets that are shifted by way of frictional, and/or gearshifting elements, such as clutches and brakes, and usually connected to a starting element, like a hydrodynamic torque converter or a fluid clutch, subject to slip action and optionally provided with a lockup clutch.

Within the scope of the Applicant's DE 101 15 983 A1, for example, a multi-speed transmission is described with one input shaft connected to a front-mounted set, with an output shaft connected to a rear-mounted set and with a maximum of seven gearshifting elements, the selective shifting of which accomplishes that at least seven forward gears can be shifted without range shifts The front-mounted set consists of a shiftable or non-shiftable planetary gearset or of a maximum of two non-shiftable planetary gearsets connected to one another. The rear-mounted set is configured as a two-carrier, four-shaft transmission with two shiftable planetary gearsets featuring four free shafts. The first free shaft of this two-carrier, four-shaft transmission is connected to the first gearshifting element; the second free shaft to the second and third gearshifting element; the third free shaft to the fourth and fifth gearshifting element, and the fourth free shaft to the output shaft. For a multi-speed transmission with a total of six gearshifting elements, according to the present invention, it is proposed that the third free shaft or the first free shaft of the rear-mounted set be additionally connected to a sixth gearshifting element. For a multi-speed transmission with a total of seven gearshifting elements, according to the present invention, it is proposed that the third free shaft be additionally connected to a sixth gearshifting element, and the first free shaft additionally to a seventh gearshifting element.

Several other multi-speed transmissions are, for example, also known from the Applicants DE 101 15 995 A1, where four shiftable, planetary gearsets connected to one another and six or seven frictionally engaged gearshifting elements are provided, by way of whose selective engaging a rotational speed of an input shaft of the transmission can be transferred to the output shaft of the transmission, such that nine or eleven forward gears and at least one reverse gear can be selected. Depending on the shift pattern, two or three gearshifting elements are engaged in each gear, so that when shifting from one gear to the correspondingly next higher or next lower gear, in order to avoid range shifts, only one engaged gearshifting element is disengaged at a time and one previously disengaged gearshifting element is shifted.

Further, in the Applicant's generic, unpublished patent application DE 10 2005 002 337.1, a multi-speed transmission with an input shaft, an output shaft, four individual planetary gearsets connected to one another and five gearshifting elements are proposed in which eight forward gears can be selected without range shifts, such that when shifting from one forward gear to the next higher or next lower forward gear, only one of the previously engaged gearshifting elements is disengaged and only one of the previously disengaged gearshifting elements is engaged. The multi-speed transmission also features one reverse gear. In all forward gears and in the reverse gear, three gearshifting elements are engaged at a time. Regarding the kinematic coupling of the four planetary gearsets to one another and to the input and output shafts, it is provided that a carrier of the fourth planetary gearset and the input shaft are connected to one another and form a first shaft of the transmission; a carrier of the third planetary gearset and the output shaft are connected to one another and form a second shaft of the transmission; a sun gear of the first planetary gearset and a sun gear of the fourth planetary gearset are connected to one another and form a third shaft of the transmission; a ring gear of the first planetary gearset forms a fourth shaft of the transmission; a ring gear of the second planetary gearset and a sun gear of the third planetary gearset are connected to one another and form a fifth shaft of the transmission; a carrier of the first planetary gearset and a ring gear of the third planetary gearset are connected to one another and form a sixth shaft of the transmission; a sun gear of the second planetary gearset and a ring gear of the fourth planetary gearset are connected to one another and form a seventh shaft of the transmission, and a carrier of the second planetary gearset forms an eighth shaft of the transmission. With respect to the kinematic coupling of the five gearshifting elements to the four planetary gearsets and to the input and output shaft, it is provided that the first shifting element is arranged in the force flow path; between the third shaft and a transmission housing; the second gearshifting element, between the fourth shaft and the transmission housing; the third gearshifting element, between the first and fifth shaft; the fourth gearshifting element, either between the eighth and second shaft or between the eighth and sixth shaft, as well as the fifth gearshifting element, either between the seventh and fifth shaft or between the sixth and eighth or between the fifth and eighth shaft.

Automatic transmissions in planetary design for motor vehicles have already been described several times, in general, in the prior art, and are subject to permanent further developments and improvements. These transmissions should thus have a sufficient number of forward gears, as well as one reverse gear and a gear ratio that is highly suitable for motor vehicles with a high overall transmission-ratio spread, as well as favorable step jumps. They should further make possible a high starting ratio in the forward direction and have one direct gear, as well as be suitable for use in both private and commercial vehicles. Besides, these transmissions should be simple to construct, in particular requiring a small number of gearshifting elements and avoid double shifts on sequential shifting so that, when shifting within defined gear ranges, only one gearshifting element is shifted each time.

The present invention is based on the task of proposing a multi-speed transmission of the type mentioned above with at least eight forward gears that can be selected without range shifts and at least one reverse gear in which the smallest possible number of gearshifting elements are required while using a total of four planetary gearsets. In addition, the transmission should feature a large spread with comparatively coordinated gearshifting and a favorable degree of efficiency, i.e., relatively low drag and gear losses in the main driving gears at least.

This task is solved, according to the present invention, by a multi-speed transmission.

SUMMARY OF THE INVENTION

Accordingly, an entire family of multi-speed transmissions in planetary design is proposed, which are all based on the Applicant's generic patent application DE 10 2005 002 337.1. All the multi-speed transmissions feature an input shaft, an output shaft, four planetary gearsets connected to one another, at least eight rotatable shafts, as well as five gearshifting elements (two brakes and three clutches). The selective engagements result in different gear ratios between the input shaft and the output shaft so that eight forward gears and one reverse gear can be realized. In each gear, three of the of five gearshifting elements are engaged at a time, wherein when shifting from a forward gear to the next higher or lower forward gear, only one of the previously engaged gearshifting elements is disengaged at a time and only one of the previously disengaged gearshifting elements is engaged.

In a first solution to the task according to the present invention, it is proposed that a carrier of the fourth planetary gearset and the input shaft are connected to one another and form the first shaft of the transmission; a carrier of the third planetary gearset and the output shaft are connected to one another and form the second shaft; a sun gear of the first planetary gearset and a sun gear of the fourth planetary gearset are connected to one another and form the third shaft of the transmission; a ring gear of the first planetary gearset forms the fourth shaft of the transmission; a sun gear of the third planetary gearset forms the fifth shaft of the transmission; a carrier of the first planetary gearset and a carrier of the second planetary gearset and a ring gear of the planetary gearset are connected to one another and form the sixth shaft of the transmission; a sun gear of the second planetary gearset and a ring gear of the fourth planetary gearset are connected to one another and form the seventh shaft of the transmission; a ring gear of the second planetary gearset forms the eighth shaft of the transmission; the first gearshifting element is arranged in the force flow path between the third shaft and a transmission housing; the second gearshifting element is arranged in the force flow path between the fourth shaft and the transmission housing; the third gearshifting element is arranged in the force flow path between the first and fifth shafts of the transmission; the fourth gearshifting element is arranged in the force flow path between the second and eighth shaft of the transmission, and the fifth gearshifting element is arranged in the force flow path between the fifth and the seventh shaft of the transmission.

In a second solution to the task according to the present invention, it is proposed that a carrier of the fourth planetary gearset and the input shaft are connected to one another and form the first shaft; a carrier of the second planetary gearset and a carrier of the third planetary gearset and the output shaft are connected to one another and form the second shaft of the transmission; a sun gear of the first planetary gearset and a sun gear of the fourth planetary gearset are connected to one another and form the third shaft of the transmission; a ring gear of the first planetary gearset forms the fourth shaft of the transmission; a ring gear of the second planetary gearset and a sun gear of the third planetary gearset are connected to one another and form the fifth shaft of the transmission; a carrier of the first planetary gearset and a ring gear of the third planetary gearset are connected to one another and form the sixth shaft of the transmission; a ring gear of the fourth planetary gearset forms the seventh shaft of the transmission; a sun gear of the second planetary gearset forms the eighth shaft of the transmission; the first gearshifting element is arranged in the force flow path between the third shaft and a transmission housing; the second gearshifting element is arranged in the force flow path between the fourth shaft and the transmission housing; the third gearshifting element is arranged in the force flow path between the first and fifth shaft of the transmission; the fourth gearshifting element is arranged in the force flow path between the seventh and the eighth shaft of the transmission, and the fifth gearshifting element is arranged in the force flow path between the fifth and seventh shaft of the transmission.

In a third solution to the task according to the present invention, it is proposed that a carrier of the fourth planetary gearset and the input shaft are connected to one another and form the first shaft of the transmission; a ring gear of the second planetary gearset and a carrier of the third planetary gearset and the input wave are connected to one another and form the second shaft of the transmission; a sun gear of the first planetary gearset and a sun gear of the fourth planetary gearset are connected to one another and form the third shaft of the transmission; a ring gear of the first planetary gearset form the fourth shaft of the transmission; a sun gear of the third planetary gearset forms the fifth shaft of the transmission; a carrier of the first planetary gearset and a ring gear of the third planetary gearset are connected to one another and form the sixth shaft of the transmission; a sun gear of the second planetary gearset and a ring gear of the fourth planetary gearset are connected to one another and form the seventh shaft of the transmission, and a carrier of the second planetary gearset forms the eighth shaft of the transmission; the first gearshifting element is arranged in the force flow path between the third shaft and a transmission housing; the second gearshifting element is arranged in the force flow path between the fourth shaft and a transmission housing; a third gearshifting element is arranged in the force flow path between the first and the fifth shaft of the transmission; the fourth gearshifting element is arranged in the force flow path between the sixth and eighth shaft of the transmission, and the fifth gearshifting element is arranged in the force flow path between the fifth and seventh shaft of the transmission.

In a fourth solution to the task according to the present invention, it is proposed that a carrier of the fourth planetary gearset and the output shaft are connected to one another and form the first shaft of the transmission; a ring gear of the second planetary gearset and a carrier of the third planetary gearset and the output shaft are connected to one another and form the second shaft of the transmission; a sun gear of the first planetary gearset and a sun gear of the fourth planetary gearset are connected to one another and form the third shaft of the transmission; a ring gear of the first planetary gearset form the fourth shaft of the transmission; a sun gear of the third planetary gearset forms the fifth shaft of the transmission; a carrier of the first planetary gearset and a carrier of the second planetary gearset and a ring gear of third the planetary gearset are connected to one another and form the sixth shaft of the transmission; a ring gear of the fourth planetary gearset forms the seventh shaft of the transmission; a sun gear of the second planetary gearset forms the eight shaft of the transmission; the first gearshifting element is arranged in the force flow path between the third shaft and a transmission housing; the second gearshifting element is arranged in the force flow path between the fourth shaft and the transmission housing; the third gearshifting element is arranged in the force flow path between the first and fifth shaft of the transmission; the fourth gearshifting element is arranged in the force flow path between the seventh and eighth shaft of the transmission, and the fifth gearshifting element is arranged in the force flow path between the fifth and seventh shaft of the transmission.

In a fifth solution to the task according to the present invention, it is proposed that a carrier of the fourth planetary gearset and the input shaft are connected to one another and form the first shaft of the transmission; a carrier of the third planetary gearset and the output shaft are connected to one another and form the second shaft of the transmission; a sun gear of the first planetary gearset and a sun gear of the fourth planetary gearset are connected to one another and form the third shaft of the transmission; a ring gear of the first planetary gearset forms the fourth shaft of the transmission; a sun gear of the third planetary gearset forms the fifth shaft of the transmission; a carrier of the first planetary gearset and a carrier of the second planetary gearset and a ring gear of the third planetary gearset are connected to one another and form the sixth shaft of the transmission; a ring gear of the second planetary gearset and a ring gear of the fourth planetary gearset are connected to one another and form the seventh shaft of the transmission; a sun gear of the second planetary gearset forms the eighth shaft of the transmission; the first gearshifting element is arranged in the force flow path between the third shaft and a transmission housing; the second gearshifting element is arranged in the force flow path between the fourth shaft and the transmission housing; the third gearshifting element is arranged in the force flow path between the first and fifth shaft of the housing; the fourth gearshifting element is arranged in the force flow path between the fifth and eight shaft of the transmission, and the fifth gearshifting element is arranged in the force flow path between the fifth and seventh shaft of the transmission.

In a sixth solution to the task according to the present invention, it is proposed that a carrier of the fourth planetary gearset and the input shaft are connected to one another and form the first shaft of the transmission; a carrier of the third planetary gearset and the output shaft are connected to one another and form the second shaft of the transmission; a sun gear of the first planetary gearset and a sun gear of the fourth planetary gearset are connected to one another and form the third shaft of the transmission; a ring gear of the first planetary gearset forms the fourth shaft of the transmission; a ring gear of the second planetary gearset and a sun gear of the third planetary gearset are connected to one another and form the fifth shaft of the transmission; a carrier of the first planetary gearset and a carrier of the second planetary gearset and a sun gear of the third planetary gearset are connected to one another and form the sixth shaft of the transmission; a ring gear of the fourth planetary gearset forms the seventh shaft of the transmission; and a sun gear of the second planetary gearset forms the eighth shaft of the transmission; the first gearshifting element is arranged in the force flow path between the first shaft and a transmission housing; the second gearshifting element is arranged in the force flow path between the fourth shaft and the transmission housing; the third gearshifting element is arranged in the force flow path between the first and fifth shaft of the transmission; the fourth gearshifting element is arranged in the force flow path between the seventh and eight shaft of the transmission; the fifth gearshifting element is arranged in the force flow path between the fifth and seventh shaft of the transmission.

In a seventh solution to the task according to the present invention, it is proposed that a carrier of the fourth planetary gearset and the input shaft are connected to one another and form the first shaft of the transmission; a carrier of the third planetary gearset and the output shaft are connected to one another and form the second shaft of the transmission; a sun gear of the first planetary gearset and a sun gear of the fourth planetary gearset are connected to one another in a torsion-proof manner and form the third shaft of the transmission; a ring gear of the first planetary gearset forms the fourth shaft of the transmission; a sun gear of the second planetary gearset and a sun gear of the third planetary gearset are connected to one another and form the fifth shaft of the transmission; a carrier of the first planetary gearset and a ring gear of the third planetary gearset are connected to one another and form the sixth shaft of the transmission; a ring gear of the second planetary gearset and a ring gear of the fourth planetary gearset are connected to one another and form the seventh shaft of the transmission; a carrier of the second planetary gearset forms the eight shaft of the transmission; the first gearshifting element is arranged in the force flow path between the third shaft and a transmission housing; the second gearshifting element is arranged in the force flow path between the fourth shaft and the transmission housing; the third gearshifting element is arranged in the force flow path between the first and fifth shaft of the transmission; the fourth gearshifting element is arranged in the force flow path between the sixth and eight shaft of the transmission, and the fifth gearshifting element is arranged in the force flow path between the fifth and seventh shaft of the transmission.

The common inventive idea in all seven solutions is that the connection of the kinematic coupling of the first, third, and fourth planetary gearsets to one another and their connection to the input and output shaft, as well as the shift pattern of the five gearshifting elements were taken from the generic patent application DE 10 2005002 337.1but, compared to the generic patent application DE 10 2005 002 337.1, the second planetary gearset is coupled to the other three planetary gearsets in a different way.

For all multi-speed transmissions according to the present invention of this transmission family, it applies that the first forward gear results by engaging the first, second and third gearshifting element; the second forward gear by engaging the first, second and fifth gearshifting element; the third forward gear by engaging the second, third and fifth gearshifting element; the fourth forward gear by engaging the second, fourth and fifth gearshifting element; the fifth forward gear by engaging the second, third and fourth gearshifting element; the sixth forward gear by engaging the third, fourth and fifth gearshifting element; the seventh forward gear by engaging the first, third and fourth gearshifting element; the eighth forward gear by engaging the first, fourth and fifth gearshifting element, and the reverse gear by engaging the first, second and fourth gearshifting element.

For all multi-speed transmissions according to the present invention in the transmission family the following also applies.

All four planetary gearsets are preferably executed as so-called minus-planetary gearsets, whose respective planetary gears mesh with the sun gear and ring gear of the corresponding planetary gearset. Regarding the spatial arrangement of the four planetary gearsets in the transmission housing, in an advantageous embodiment, it is proposed that all four planetary gearsets are arranged consecutively co-axial to one another in the sequence "first, fourth, second, third planetary gearsets". For an application with input and output shafts that run co-axially to one another, it is convenient in this case that the first planetary gearset is the planetary gearset of the group of planetary gearsets facing the transmission input according to the present invention.

In principle, the spatial arrangement of the gearshifting elements of the multi-speed transmission inside the transmission housing is only restricted by the dimensions and external shape of the transmission housing GG. Numerous suggestions for the spatial arrangement and constructive embodiment of the gearshifting elements are apparent from the generic patent application DE 10 2005 002 337.1.

The embodiment of the multi-speed transmission provides adequate transmission ratios with a wide overall spread with harmonic gearshifting results for private vehicles in particular so that good driving comfort and a significant reduction in consumption is achieved.

Furthermore, with the multi-speed transmissions, the constructive effort is relatively low due to the small number of gearshifting elements, i.e., two brakes and three clutches. With the multi-speed transmission, the vehicle may advantageously be started with a hydrodynamic converter, an external starting clutch or with other suitable external starting elements. It is also conceivable to make the startup process possible by way of a starting element that is integrated into the transmission. One of the two brakes actuated in the first and second forward gears and in the reverse gear, is especially suitable for this purpose.

Furthermore, with the multi-speed transmissions according to the present invention, there is a good degree of efficiency in all gears, on the one hand, due to low drag losses because in each gear only two gearshifting elements are not engaged and, on the other hand, also due to low gear losses in the single planetary gearsets designed in a simple manner.

In addition, the multi-speed transmissions are designed such that adjustment to different drive train embodiments is possible in regard to the direction of the force flow path as well as to the spatial aspect. It is possible to arrange the input and output of the transmission either co-axially or axially parallel to one another without special constructive measures.

BRIEF DESCRIPTION OF THE DRAWINGS

The invention will now described, by way of example, with reference to the accompanying drawings. Identical and/or comparable components are provided with the same reference numerals. The drawings show:

FIG. 1A is an exemplary shift pattern for the multi-speed transmission according to FIG. 1;

FIG. 2A is an exemplary shift pattern for the multi-speed transmission according to FIG. 2;

FIG. 3A is an exemplary shift pattern for the multi-speed transmission according to FIG. 3;

FIG. 4A is an exemplary shift pattern for the multi-step transmission according to FIG. 4;

FIG. 5A is an exemplary shift pattern for the multi-step transmission according to FIG. 5;

FIG. 6A is an exemplary shift pattern for the multi-step transmission according to FIG. 6;

FIG. 7A is an exemplary shift pattern for the multi-step transmission according to FIG. 7.

DETAILED DESCRIPTION OF THE INVENTION

Figure 1:
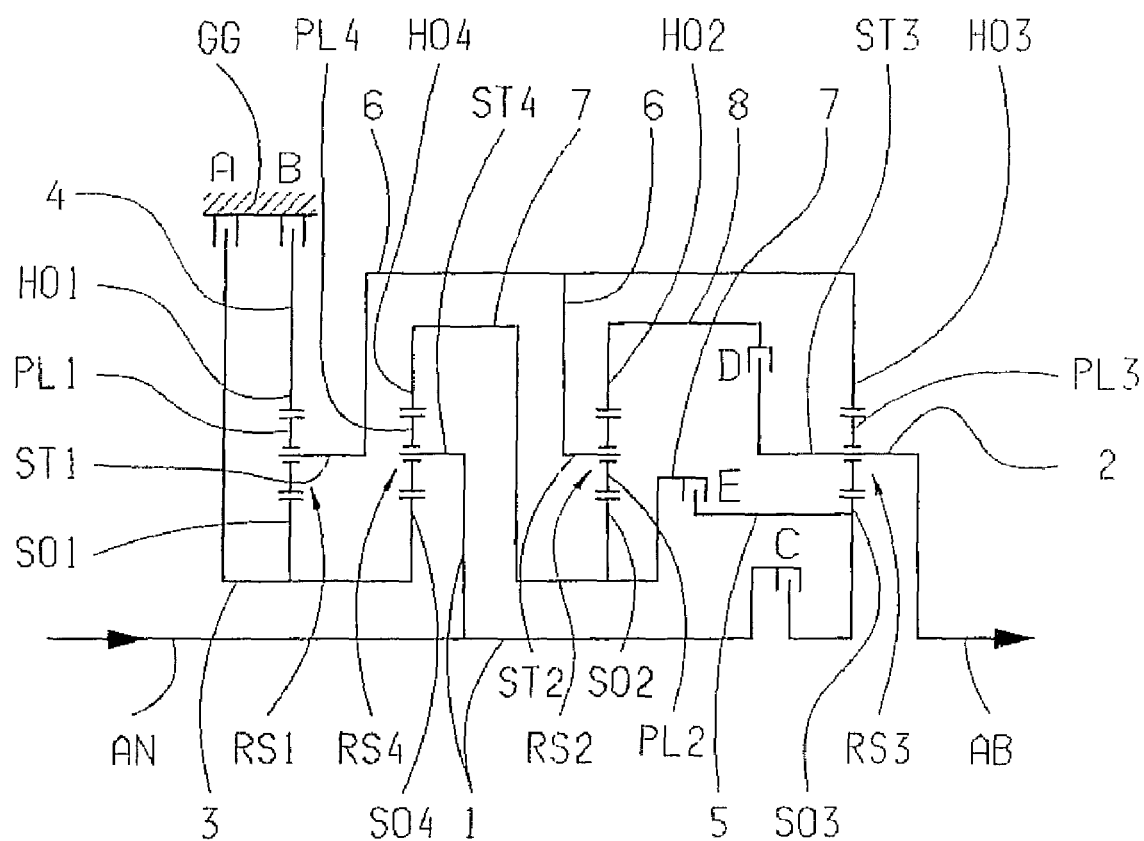
FIG. 1 is a schematic representation of an exemplary embodiment of a multi-speed transmission in line with the first solution according to the present invention.

FIG. 1 shows the schematic representation of an exemplary embodiment of a multi-speed transmission in line with the first solution according to the present invention. The transmission comprises an input shaft AN and an output shaft AB, as well as four planetary gearsets RS1, RS2, RS3, RS4 and five gearshifting elements A, B, C, D, E, which are all arranged in a housing GG. All four planetary gearsets RS1, RS2, RS3, RS4 are configured as simple minus-planetary gearsets and in this exemplary embodiment are arranged in the axial direction consecutively co-axial in the sequence "RS1, RS4, RS2, RS3". As is generally known, a minus-planetary gearset has planetary gears that mesh with the sun and ring gears of the planetary gearset. The ring gears of the four planetary gearsets RS1, RS2, RS3, RS4 are designated with HO1, HO2, HO3 and HO4, the sun gears with SO1, SO2, SO3 and SO4, the planetary gears with PL1, PL2, PL3 and PL4 and the carriers on which the planetary gears are rotatably mounted with ST1, ST2, ST3 and ST4. The gearshifting elements A and B are configured as brakes which, in the illustrated exemplary embodiment, are both configured as shiftable friction-locked disk brakes and which, in another embodiment, may naturally be configured as a shiftable friction-locked band brakes or also as a shiftable form-locking claw or conical brake. The gearshifting elements C, D and E are configured as clutches, which in the illustrated exemplary embodiment, are all configured as shiftable friction-locked multi-disk clutches and which may, of course, be configured in another embodiment as shiftable form-locking claw or conical clutches. With these five shifting elements A to E, selective shifting eight forward gears and at least one reverse gear is possible. The inventive multi-speed transmission features a total of at least eight rotatable shafts, which are designated with 1 to 8.

With respect to the kinematic coupling of the individual elements of the four planetary gearsets RS1, RS2, RS3, RS4 to one another and to the input and output shafts AN, AB, the following is provided in the multi-speed transmission, according to FIG. 1: the carrier ST4 of the fourth planetary gearset RS4 and the input shaft AN are permanently connected to one another and form the first shaft 1 of the transmission. The carder ST3 of the third planetary gearset RS3 and the output shaft AB are permanently connected to one another and form the second shaft 2 of the transmission. The sun gear SO1 of the first planetary gearset RS1 and the sun gear SO4 of the fourth planetary gearset RS4 are permanently connected to one another and form the third shaft 3 of the transmission. The ring gear HO1 of the first planetary gearset RS1 forms the fourth shaft of the transmission. The sun gear SO3 of the third planetary gearset RS3 forms the fifth shaft 5 of the transmission. The carrier ST1 of the first planetary gearset RS1 and the carrier ST2 of the second planetary gearset RS2 and the ring gear HO3 of the third planetary gearset RS3 are permanently connected to one another and form the sixth shaft 6 of the transmission. The sun gear SO2 of the second planetary gearset RS2 and the ring gear HO4 of the fourth planetary gearset RS4 are permanently connected to one another and form the seventh shaft 7 of the transmission. Finally, the ring gear HO2 of the second planetary gearset RS2 forms the eighth shaft 8 of the transmission.

With respect to the kinematic coupling of the five gearshifting elements A to E to the so described shafts 1 to 8 of the transmission, the following is provided in the multi-speed transmission according to FIG. 1: brake A is arranged as the first gearshifting element in the force flow path between the third shaft 3 and the transmission housing GG. As the second gearshifting element, brake B is arranged in the force flow path between the fourth shaft 4 and the transmission housing GG. Clutch C is arranged as the third gearshifting element in the force flow path between the first and fifth shaft 1, 5. As the fourth gearshifting element, clutch D is arranged in the force flow path between the second and eighth shaft 2, 8. Finally, as the fifth gearshifting element, clutch E is arranged in the force flow path between the fifth and seventh shaft 5, 7.

The difference between the gearset patterns in the generic patent application DE 10 2005 002 337.1 and that of FIG. 1 is found in the kinematic connection of the second planetary gearset RS2 to the other three planetary gearsets RS1, RS3, RS4 of the transmission.

In the exemplary embodiment, shown in FIG. 1, the first planetary gearset RS1 is the gearset of the transmission close to the input drive and the third planetary gearset RS3 is the gearset of the transmission next to the output drive. The input shaft AN and the output shaft AB, for example, is arranged co-axially to one another. It will be readily apparent to the person skilled in the art that this transmission can be modified quite easily so that input and output shaft are no longer arranged co-axially to one another, but axially parallel or at an angle to one another. With this type of arrangement, the person skilled in the art will, if required, also arrange the input of the transmission nearer to the third planetary gearset RS3, i.e., on the side of the third planetary gearset RS3 facing away from the first planetary gearset RS1.

In principle, the spatial arrangement of the gearshifting elements of the exemplary embodiment of the multi-speed transmission shown in FIG. 1 is arbitrary and restricted only by the dimensions and external shape of the transmission housing GG.

In the exemplary embodiment shown in FIG. 1, viewed spatially, the two brakes A, B are arranged in the area of the first planetary gearset RS1 which, in this Figure, is near the input drive, i.e., axially parallel, the kinematic connection of the two brakes A, B with the two planetary gearsets RS4 and RS1 determining that brake B is arranged closer to the second planetary gearset RS2 than to brake A and/or that brake A is arranged closer to the input drive of the transmission than to brake B. Viewed spatially, brake B is arranged radially at least in part in an area above the first planetary gearset RS1 and brake A, correspondingly, on the side (near the input drive) of the first planetary gearset RS1 facing away from the fourth planetary gearset RS4. The person skilled in the art will naturally modify this exemplary spatial arrangement of the two brakes A, B, as required. Brake A can be arranged at least in part radially above the first planetary gearset RS1 and brake B at least in part above the fourth planetary gearset RS4. In yet another embodiment, the two brakes A, B can also be arranged radially one above the other, axially adjacent to the first planetary gearset RS1 on the side of the first planetary gearset facing away from the fourth planetary gearset RS4, brake B being advantageously arranged on a larger diameter than brake A.

As can also be seen in FIG. 1, viewed spatially, the three clutches C, D and E are arranged axially in an area between the second and third planetary gearset RS2, RS3. Clutch E is thus arranged adjacent to the second planetary gearset RS2 and clutch D adjacent to the third planetary gearset RS3. Viewed spatially, clutch C is arranged at least in part radially below the disk pack of clutch D. In another embodiment, clutch C can also be arranged at least in part radially below the disk pack of clutch E. In yet another embodiment, however, clutch C can be arranged axially between two clutches D, E. All three clutches D, C, E then are arranged advantageously on the same or on at least a similar diameter. In a further embodiment, clutch C can also be arranged on the side of the third planetary gearset RS3 facing away from the second planetary gearset RS2. Furthermore, clutch C can also be arranged axially in an area between the fourth and second planetary gearset RS4, RS2, thereby preferably adjacent to and/or axially adjacent to the fourth planetary gearset RS4.

According to the spatial arrangement of the four gearsets viewed in the axial direction in the sequence "RS1, RS4, RS2, RS3" in connection with the spatial arrangement of the five gearshifting elements A to E shown in FIG. 1, the first shaft 1 of the of the transmission runs in sections centrically inside the third shaft 3 in sections centrically inside the seventh shaft 7 and in sections centrically inside the fifth shaft 5. The fifth shaft 5, on its part, runs in sections centrically inside the eighth shaft 8 and, along its axial course, overlaps clutch E. Furthermore, the sixth shaft 6, along its axial course, completely overlaps the fourth planetary gearset RS4, the shaft 7, the second planetary gearset RS2, the shaft 8, and the clutch D and thus also the two clutches E and C. Only shaft 1 and/or the input shaft AN runs centrically through the first, fourth and second planetary gearsets RS1, RS4, RS2 in the axial direction. Clutch C is arranged, at least to a large extent, inside a cylindrical space, which is formed by a section of shaft 1 configured as an external disk carrier for this clutch C.

Clutch E is arranged, at least to a large extent, inside a cylindrical space, which is formed by a section of shaft 7 configured as an external disk carrier for this clutch E. Clutch D is arranged, at least in part, inside a cylindrical space, which is formed by shaft 8. On the other hand, clutches D, C, E are also arranged inside a cylindrical space formed by shaft 6, clutch E inside a cylindrical space formed by shaft 8 and clutch C also inside a cylindrical space formed by shaft 5.

In FIG. 1A, a shift pattern of the multi-speed transmission, according to the present invention, is shown according to FIG. 1. In each gear, three gearshifting elements are engaged and two gearshifting elements are disengaged. Besides the gearshift logic, exemplary values for the transmission ratios i of the individual gear steps and the step jumps φ that can be derived from them can be seen from the shift pattern. The specified transmission ratios are derived from the (typical) stationary gear ratios of the four planetary gearsets RS1, RS2, RS3, RS4 of minus 1.60, minus 3.70, minus 3.70 and minus 1.80. Furthermore, it can be seen from the shift pattern that with sequential shifting double shifts and/or range shifts can be avoided, because two gear steps adjacent to one another in the gearshift logic jointly use two gearshifting elements. The sixth gear is configured as a direct gear.

The first forward gear results by engaging brakes A and B and clutch C; the second forward gear by engaging brakes A and B and clutch E; the third forward gear by engaging brake B and clutches C and E; the fourth forward gear by engaging brake B and clutches D and E; the fifth forward gear by engaging brake B and clutches C and D; the sixth forward gear by engaging clutches C, D and E; the seventh forward gear by engaging brake A and clutches C and D and the eighth forward gear by engaging brake A and clutches D and E. As can further be seen from the shift pattern, the reverse gear results by engaging brakes A and B and clutch D.

According to the present invention, it is possible to start the motor vehicle with a gearshifting element integrated into the transmission. In this case, a particularly suitable gearshifting element is one that is required in both forward and reverse gear, in this case preferably brake A or brake B. Advantageously, these two brakes A, B are also required in the second forward gear. If brake B is used as the starting element that is integrated into the transmission, starting is possible even in the first five forward gears and the reverse gear. As the shift pattern shows, clutch C can also be used to start in the forward direction and clutch D can be used as a starting element integrated into the transmission to start in the reverse direction.

Figure 2:
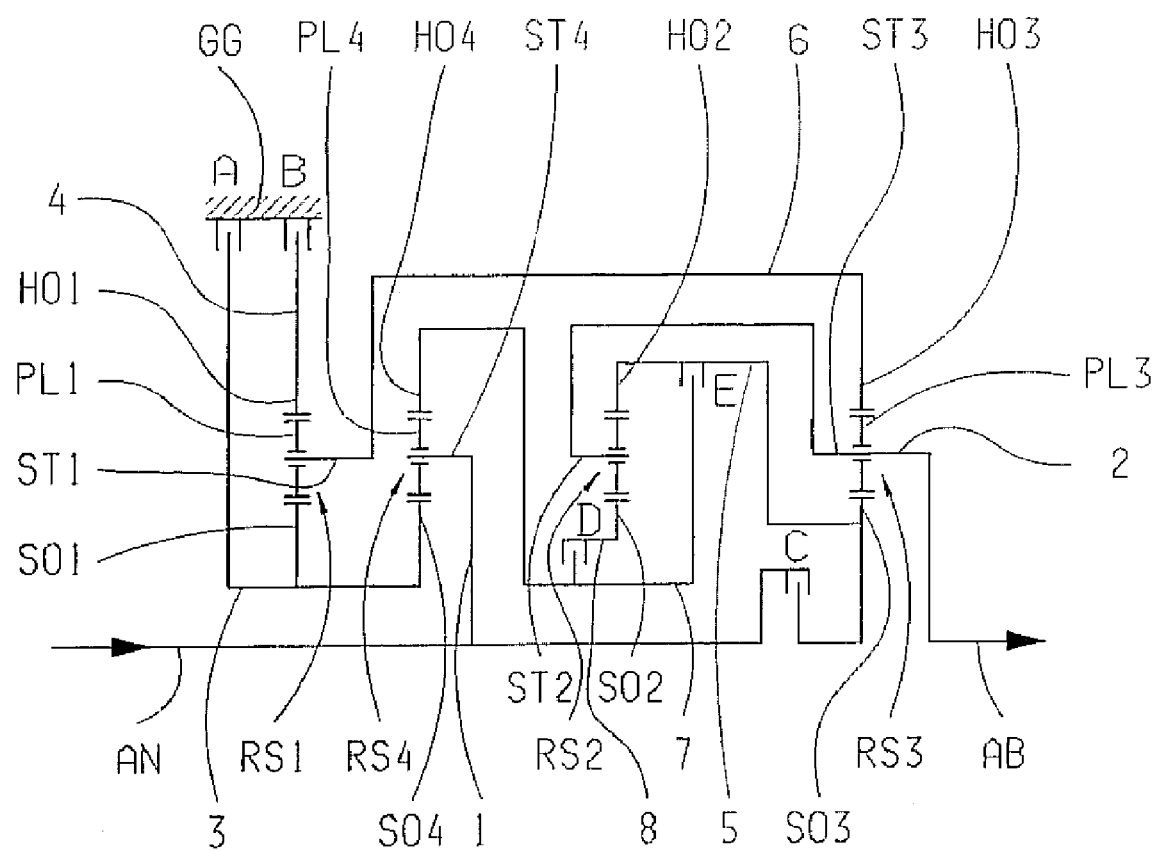
FIG. 2 is a schematic representation of an exemplary embodiment of a multi-speed transmission in line with the second solution according to the present invention.

FIG. 2 now shows an exemplary embodiment of a multi-speed transmission in line with the second solution according to the present invention, again in schematic representation. Similar to FIG. 1, the transmission features an input shaft AN and an output shaft AB, four planetary gearsets RS1, RS2, RS3, RS4 arranged in the transmission housing GG and five gearshifting elements A, B, C, D, E, as well as a total of at least eight rotatable shafts 1, 2, 3, 4, 5, 6, 7, 8. All four planetary gearsets RS1, RS2, RS3, RS4 are configured as simple minus-planetary gearsets and, in this exemplary embodiment, arranged consecutively co-axially in axial direction in the sequence "RS1, RS4, RS2, RS3". The gearshifting elements A and B are configured as brakes, for example, as frictionally engaged shiftable multi-disk disk brakes. The gearshifting elements C, D, and E are configured as clutches, for example, configured as frictionally engaged shiftable multi-disk disk brakes. With these five gearshifting elements A to E, selective shifting of eight forward gears and at least one reverse gear can be realized.

With respect to the kinematic coupling of the individual elements of the four planetary gearsets RS1, RS2, RS3, RS4 to one another and to the input and output shafts AN, AB, the following is provided in the multi-speed transmission according to FIG. 2: the carrier ST4 of the fourth planetary gearset RS4 and the input shaft AN are permanently connected to one another and form the first shaft 1 of the transmission. The carrier ST2 of the second planetary gearset RS2 and the carrier ST3 of the third planetary gearset RS3 and the output shaft are permanently connected to one another and form the second shaft of the transmission. The sun gear SO1 of the first planetary gearset RS1 and the sun gear SO4 of the fourth planetary gearset RS4 are permanently connected to one another and form the third shaft 3 of the transmission. The ring gear HO1 of the first planetary gearset RS1 forms the fourth shaft 4 of the transmission. The ring gear HO2 of the second planetary gearset RS2 and the sun gear SO3 of the third planetary gearset RS3 are permanently connected to one another and form the fifth shaft 5 of the transmission. The carrier ST1 of the first planetary gearset RS1 and the ring gear HO3 of the third planetary gearset RS3 are permanently connected to one another and form the sixth shaft 6 of the transmission. The ring gear HO4 of the fourth planetary gearset RS4 forms the seventh shaft 7 of the transmission. Finally, the sun gear SO2 of the secondary planetary gearset RS2 forms the eighth shaft 8 of the transmission.

With respect to the kinematic coupling of the five gearshifting elements A to E to the described shafts 1-8 of the transmission, the following is provided in the case of the multi-speed transmission according to FIG. 2: brake A is arranged in the force flow path between the third shaft 3 and the transmission housing GG; brake B in the force flow path between the fourth shaft 4 and the transmission housing GG; clutch C in the force flow path between the first and fifth shaft 1,5; clutch D in the force flow path between the seventh and eighth shaft 7,8 and clutch E in the force flow path between the fifth and seventh shaft 5, 7.

The difference between the gearset patterns in the generic patent application DE 10 2005 002 337.1 and those of FIG. 1 and FIG. 2 is found in the kinematic connection of the second planetary gearset RS2 to the other three planetary gearsets RS1, RS3, RS4 of the transmission.

In principle, the spatial arrangement of the gearshifting elements of the exemplary embodiment of a multi-speed transmission, according to the present invention shown in FIG. 2, inside the transmission is arbitrary and restricted only by the dimensions and external shape of the transmission housing GG. Thus in FIG. 2, the spatial arrangement of the two brakes A, B is taken from FIG. 1. Correspondingly, the related statements made within the scope of the description of FIG. 1 are applicable to FIG. 2 as well.

As can also be seen from FIG. 2, viewed spatially as in FIG. 1, clutch C is arranged axially in an area between the second and third planetary gearset RS2, RS3, thus adjacent to the third planetary gearset RS3. Viewed spatially, clutch E is also arranged axially in an area between the second and third planetary gearset RS2, RS3, thus adjacent to the second planetary gearset RS2. Obviously, the constructive embodiment of clutches C, E, shown here, should be seen by way of example. In another embodiment, it can be provided that two clutches C, D are arranged axially parallel on the same or at least similar diameters or that clutch C, viewed spatially, is arranged at least in part radially below a disk pack of clutch E. Like in FIG. 1, clutch C can also be arranged in yet another embodiment basically on the side of the third planetary gearset RS3, which is situated opposite the second planetary gearset RS2 and/or clutch E or also axially in an area between the fourth and second planetary gearset RS4, RS2.

As can also be seen from FIG. 2, viewed spatially, clutch D is arranged axially in an area between the fourth and second planetary gearset RS4, RS2, thus adjacent to the second planetary gearset RS2. Here too, of course, the represented constructive embodiment of clutch D should be seen by way of example. In another exemplary embodiment, it can also be provided that clutch D is arranged on a larger diameter than shown, a disk pack of clutch D, for example, on a diameter similar to that of the ring gear HO2 of the second planetary gearset RS2. In yet another embodiment, viewed spatially, clutch D can also be arranged axially in an area between the second the third planetary gearset RS2, RS3, then preferably immediately axially adjacent to the second planetary gearset RS2 and basically axially between RS2 and clutch E.

According to the spatial arrangement of the four planetary gearsets viewed in the axial direction in the sequence "RS1, RS4, RS2, RS3" in connection with the spatial arrangement of the five gearshifting elements A to E, shown in FIG. 2, the first shaft of the transmission runs in sections centrically inside the third shaft 3, in sections centrically inside the seventh shaft 7 and in sections centrically inside the fifth shaft 5. The fifth shaft 5, on its part, thus runs in sections centrically inside a section of the second shaft 2 and along its axial course overlaps clutch C. In turn, the section of shaft 2 along its axial course completely overlaps clutch E Furthermore, the sixth shaft 6 along its axial course completely overlaps the fourth planetary gearset RS4, the shaft 7, the clutch D, the second planetary gearset RS2 and the section of the shaft 2 and thus also the two clutches E and C. Only shaft 1 and/or the input shaft AN runs centrically through the first and the fourth planetary gearsets RS1, RS4, while two shafts, shaft 1 and/or the input shaft and shaft 7, run centrically in the axial direction through the second planetary gearset RS2. Clutch D is arranged at least to a large extent inside a cylindrical space that is formed by shaft 8. Furthermore, clutch E is arranged inside a cylindrical space formed by shaft 5 and clutch C at least to a large extent inside a cylindrical space formed by shaft 1. On the other hand, clutches D, C, E are also arranged inside a cylindrical space formed by shaft 6, clutches C, E also inside a cylindrical space formed by shaft 2 and clutch C also inside a cylindrical space formed by shaft 5.

FIG. 2A shows a shift pattern for the multi-speed transmission, according to the present invention in line with FIG. 2. In each gear, three gearshifting elements are engaged and two gearshifting elements are disengaged, wherein the gearshift logic is identical to FIG. 1A. Besides this gearshift logic, the shift pattern also shows exemplary values for the respective transmission ratios i of the individual gear steps and the step jumps φ that can be derived from them. The specified transmission ratios i are derived from the (typical) stationary gear ratios of the four planetary gearsets RS1, RS2, RS3, RS4 of minus 2.10, minus 1.60, minus 3.70 and minus 2.00.

Figure 3:
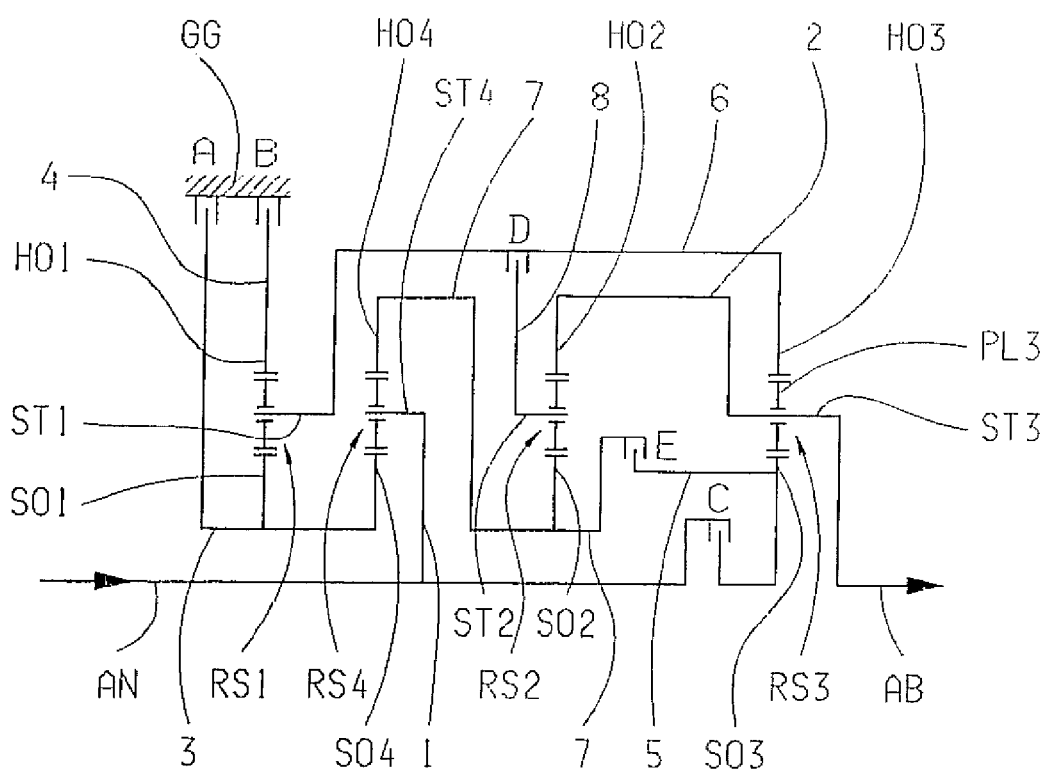
FIG. 3 is a schematic representation of an exemplary embodiment of a multi-speed transmission in line with the third solution according to the present invention.

FIG. 3 now shows an exemplary embodiment of a multi-speed transmission in line with the third solution, according to the present invention, also in schematic representation. Similar to FIG. 1, the transmission features the input shaft AN and the output shaft AB, four planetary gearsets RS 1, RS2, RS3, RS4 arranged in the housing GG of the transmission and five gearshifting elements A, B, C, D, E, as well as a total of at least eight rotatable shafts 1, 2, 3, 4, 5, 6, 7, 8. All four planetary gearsets RS1, RS2, RS3, RS4 are configured as simple minus-planetary gearsets and, in this exemplary embodiment, they are arranged consecutively co-axially in the axial direction in the sequence "RS1, RS4, RS2, RS3". The gearshifting elements A and B are configured as brakes, for example, as frictionally engaged shiftable multiple-disk brakes. The gearshifting elements C, D and E are configured as clutches, for example, as frictionally engaged shiftable multi-disk clutches. With these five gearshifting elements A to E, selective shifting of eight forward gears and at least one reverse gear can be realized.

With respect to the kinematic coupling of the individual elements of the four planetary gearsets RS1, RS2, RS3, RS4 to one another and to the input and output shafts AN, AB, the following is provided in the multi-speed transmission, according to FIG. 3: the planet carrier ST4 of the fourth planetary gearset RS4 and the input shaft AN are permanently connected to one another and form the first shaft 1 of the transmission. The ring gear HO2 of the second planetary gearset RS2 and the carrier ST3 of the third planetary gearset RS3 and the output shaft AB are permanently connected to one another and form the second shaft 2 of the transmission. The sun gear SO1 of the first planetary gearset RS1 and the sun gear SO4 of the fourth planetary gearset RS4 are permanently connected to one another and form the third shaft 3 of the transmission. The ring gear HO1 of the first planetary gearset RS1 forms the fourth shaft 4 of the transmission. The sun gear SO3 of the third planetary gearset RS3 forms the fifth shaft 5 of the transmission. The carrier ST1 of the first planetary gearset RS1 and the ring gear HO3 of the third planetary gearset RS3 are permanently connected to one another and form the sixth shaft 6 of the transmission. The sun gear SO2 of the second planetary gearset RS2 and the ring gear HO4 of the fourth planetary gearset RS4 are permanently connected to one another and form the seventh shaft 7 of the transmission. And finally, the carrier ST2 of the second planetary gearset RS2 forms the eighth shaft 8 of the transmission.

With respect to the kinematic coupling of the five gearshifting elements A to E to the so described shafts 1 to 8 of the transmission, the following is provided in the multi-speed transmission according to FIG. 3: brake A is arranged in the force flow path between the third shaft 3 and the transmission housing GG; brake B in the force flow path between the fourth shaft 4 and the transmission housing GG; clutch C in the force flow path between the first and fifth shaft 1, 5; clutch D in the force flow path between the sixth and eight shaft 6, 8, and clutch E in the force flow path between the fifth and seventh shaft 5, 7.

The difference between the gearset patterns of the generic patent application DE 10 2005 002 337.1 and FIGS. 1 to 3 is, therefore, found in the kinematic connection of the second planetary gearset RS2 to the three other planetary gearsets RS1, RS3, RS4 of the transmission.

In principle, the spatial arrangement of the gearshifting elements of the exemplary embodiment of the multi-speed transmission, according to the present invention shown in FIG. 3, is arbitrary and restricted only by the dimensions and external shape of the transmission housing GG. Thus in FIG. 3, the spatial arrangement of the two brakes A, B was taken, for example from FIG. 1. Correspondingly, the related statements made within the scope of the description of FIG. 1 are applicable to FIG. 3 as well.

As can also be seen from FIG. 3, viewed spatially, clutch D is arranged axially in an area between the fourth and second planetary gearset RS4, RS2, thus adjacent to the second planetary gearset RS2 on a comparatively larger diameter. Obviously, the constructive embodiment of clutch D, shown here, should again be seen by way of example. Thus, in another embodiment, it can be provided that clutch D, in particular its disk pack, can be arranged, viewed spatially, at least in part radially in an area above the second or fourth planetary gearset RS2, RS4. In yet another embodiment, viewed spatially, clutch D can also be arranged axially in an area between the first and fourth planetary gearset RS1, RS4, in this case preferably immediately axially adjacent to the first planetary gearset RS1. In a further embodiment, clutch D can also be basically arranged axially in an area between the second and third planetary gearset RS2, RS3, in this case preferably immediately axially adjacent to the third planetary gearset RS3.

According to the spatial arrangement of the four gearsets, viewed in the axial direction in the sequence "RS1, RS4, RS2, RS3" in connection with the spatial arrangement of the five gearshifting elements A to E shown in FIG. 3, the first shaft 1 of the of the transmission runs in sections centrically inside the third shaft 3, in sections centrically inside the seventh shaft 7 and in sections centrically inside the fifth shaft 5. The fifth shaft 5 runs, in this case, in sections centrically inside a section of the second shaft and along its axial course overlaps clutch C. The section of shaft 2, in turn, overlaps clutch E completely along its axial course. Furthermore, along its axial course, the sixth shaft 6 completely overlaps the fourth planetary gearset RS4, the shaft 7, the clutch D, the second planetary gearset RS2, the section of the shaft 2 and thus also the shaft 5 and the two clutches E and C. Only shaft 1 and/or the input shaft AN runs centrically through the first, fourth and second planetary gearset RS1, RS4, RS2. Clutch D is arranged inside a cylindrical space, which is formed by shaft 6. Furthermore, clutch E is at least, to a large extent, arranged inside a cylindrical space formed by shaft 7 and clutch C and at least, to a large extent, inside a cylindrical space formed by shaft 1. On the other hand, clutches C, E are also arranged inside a cylindrical space formed by shaft 6 and also inside a cylindrical space formed by shaft 2. Furthermore, clutch C is also arranged inside a cylindrical space formed by shaft 5.

FIG. 3A shows a shift pattern of the multi-speed transmission, according to the present invention shown FIG. 3. In each gear, three gearshifting elements are engaged and two gearshifting elements are disengaged, wherein the gearshift logic is identical to FIG. 1A. Besides this gearshift logic, the shift pattern also shows exemplary values for the respective transmission ratios i of the individual gear steps and the step-jumps φ that can be derived from them. The specified transmission ratios i of the gear steps are derived from the (typical) stationary gear ratios of the four planetary gearsets RS1, RS2, RS3, RS4 of minus 2.10, minus 3.70, minus 3.15 and minus 2.20.

Figure 4:
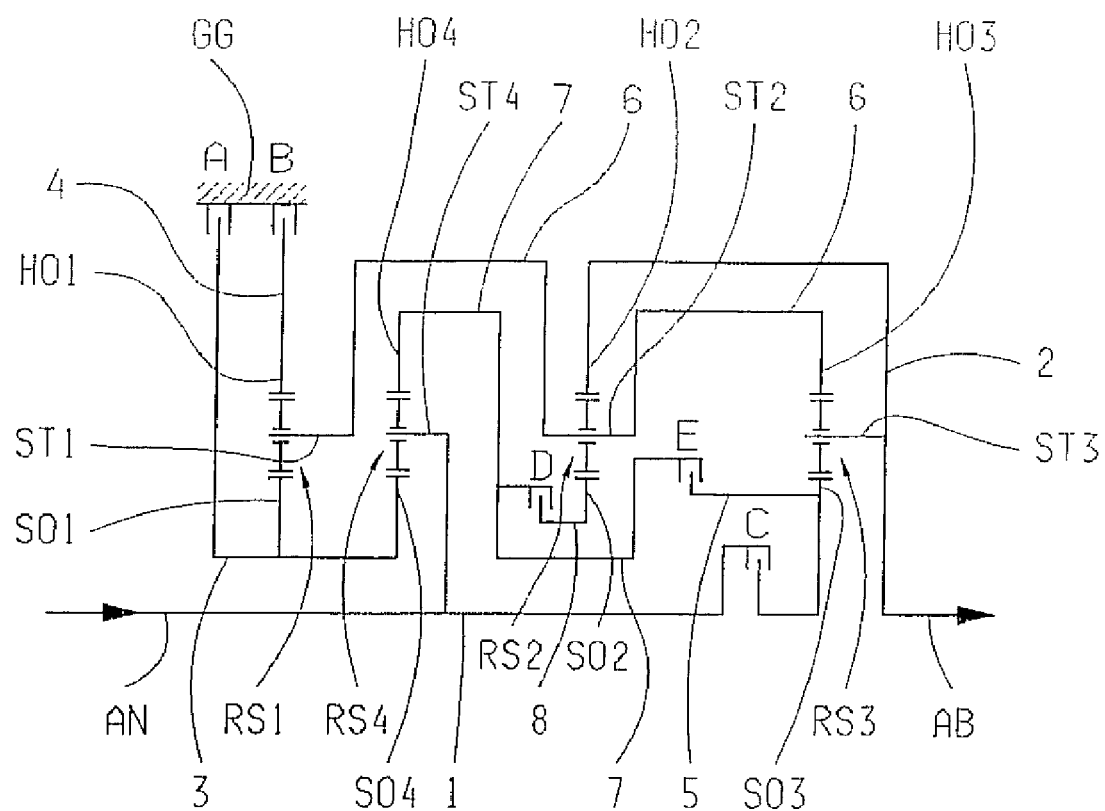
FIG. 4 is a schematic representation of an exemplary of a multi-speed transmission in line with the fourth solution according to the present invention.

FIG. 4 now shows an exemplary embodiment of a multi-speed transmission in line with the fourth solution, according to the present invention, also in schematic representation. Similarly to FIG. 1, the transmission features an input shaft AN and an output shaft AB, four planetary gearsets RS1, RS2, RS3, RS4 arranged in the transmission housing GG and five gearshifting elements A, B, C, D, E, as well as a total of at least eight rotatable shafts 1, 2, 3, 4, 5, 6, 7, 8. All four planetary gearsets RS1, RS2, RS3, RS4 are configured as simple minus-planetary gearsets and, in this exemplary embodiment, they are arranged consecutively co-axially in the axial direction in the sequence "RS1, RS4, RS2, RS3". The gearshifting elements A and B are configured as brakes as frictionally engaged shiftable multi-disk brakes. Gearshifting elements C, D and E are configured a clutches as frictionally engaged shiftable multi-disk clutches. With these five gearshifting elements A to E, selective shifting of eight forward gears and at least one reverse gear can be realized.

With respect to the kinematic coupling of the individual elements of the four planetary gearsets RS1, RS2, RS3, RS4, to one another and to the input and output shaft AN, AB, the following is provided in the case of the multi-speed transmission, according to FIG. 4: the carrier ST4 of the fourth planetary gearset RS4 and the input shaft AN are permanently connected to one another and form the first shaft 1 of the transmission. The ring gear HO2 of the second planetary gearset RS2 and the carrier ST3 of the third planetary gearset RS3 and the output shaft AB are permanently connected to one another and form the second shaft 2 of the transmission. The sun gear SO1 of the first planetary gearset RS1 and the sun gear SO4 of the fourth planetary gearset RS4 are permanently connected to one another and form the third shaft of the transmission. The ring gear HO1 of the first planetary gearset RS1 forms the fourth shaft 4 of the transmission. The sun gear SO3 of the third planetary gearset RS3 forms the fifth shaft 5 of the transmission. The carrier ST1 of the first planetary gearset RS1 and the carrier ST2 of the second planetary gearset RS2 and the ring gear HO3 of the third planetary gearset RS are permanently connected to one another and form the sixth shaft 6 of the transmission. The ring gear HO4 of the fourth planetary gearset RS4 forms the seventh shaft 7 of the transmission. Finally, the sun gear SO2 of the second planetary gearset RS2 forms the eighth shaft 8 of the transmission.

With respect to the kinematic coupling of the five gearshifting elements A to E to the so described shafts 1 to 8 of the transmission, the following is provided in the case of the multi-speed transmission, according to FIG. 4: brake A is arranged in the force flow path between the third shaft 3 and the transmission housing GG; brake B in the force flow path between the fourth shaft 4 and the transmission housing GG; coupling C in the force flow path between the first and fifth shaft 1, 5; clutch D in the force flow path between the seventh and eighth shaft 7,8, and clutch E in the force flow path between the fifth and seventh shaft 5,7.

The difference between the gearset patterns of the generic patent application DE 10 2005 002 337.1 and FIGS. 1 to 4 is thus found in the kinematic connection of the second planetary gearset RS2 to the other three planetary gearsets RS1, RS3, RS4 of the transmission.

In principle, the spatial arrangement of the gearshifting elements of the exemplary embodiment of the multi-speed transmission, according to the present invention shown in FIG. 4, is arbitrary and restricted only by the dimensions and external shape of the transmission housing GG. So, in FIG. 2, the spatial arrangement of the two brakes, A, B was taken, for example from FIG. 1. The spatial arrangement of the two clutches C, E is also similar to that in FIG. 1, wherein clutch C is arranged at least in part radially below a disk pack of clutch E. Correspondingly, the statements made in relation to the spatial arrangement of these four gearshifting elements A, B, C, E, in the description of FIG. 1, are applicable to FIG. 4 as well.

As can also be seen from FIG. 4, viewed spatially, clutch D is arranged axially in an area between the fourth and second planetary gearsets RS4, RS2, thus adjacent to the second planetary gearset RS2. Obviously, the constructive embodiment of clutch D, shown here, should also be seen by way of example. In another embodiment, for example, it can also be provided that clutch D is arranged on a larger diameter than shown, a disk pack of clutch D on a diameter similar to that of the ring gear HO2 of the second planetary gearset RS2. In yet another embodiment, viewed spatially, clutch D can also be arranged axially in an area between the second the third planetary gearset RS2, RS3, then preferably immediately axially adjacent to the second planetary gearset RS2 and basically axially between RS2 and clutch E.

According to FIG. 4, the ring gear HO4 of the fourth planetary gearset RS4 and/or shaft 7, subsequently only has shiftable connections and no permanent connections to another gearset element, in a component layout that is different from FIG. 4, it can also be provided that, viewed spatially, clutch E is arranged axially in an area between the fourth and second planetary gearset RS4, RS2, then preferably adjacent to the fourth planetary gearset RS4 (and/or axially between the fourth planetary gearset RS4 and clutch D, if clutch D stays arranged without changes on the side of the second planetary gearset RS2 facing the fourth planetary gearset RS4).

According to the spatial arrangement of the four gearsets, viewed in the axial direction, in the sequence "RS1, RS4, RS2, RS3" in connection with the spatial arrangement of the five gearshifting elements A to E shown in FIG. 3, the first shaft 1 of the transmission runs in sections centrically inside the third shaft 3 and in sections centrically inside the seventh shaft 7. Only shaft 1 and/or the input shaft AN runs centrically in the axial direction through the first and fourth planetary gearset RS1, RS4. In the area of the second planetary gearset RS2, the seventh shaft 7, in turn, runs in sections centrically inside the eighth shaft 8 and thus runs in the axial direction through the second planetary gearset RS2. Accordingly, two shafts, i.e., shaft 1 and/or an input shaft and shaft 7, run centrically in the axial direction through the second planetary gearset RS2. Along its axial course, the fifth shaft 5 overlaps clutch C. Furthermore, along its axial course, the sixth shaft 6 overlaps the fourth planetary gearset RS4, shaft 7, as well as clutch D, runs through the second planetary gearset RS2 and, in turn, completely overlaps clutch E and shaft 5 and hence clutch C as well. The section of shaft 6, between the planetary gearsets RS2, RS3, on the other hand, runs centrically inside a section of the second shaft 2. On the one hand, clutch D is arranged at least, to a large extent, inside a cylindrical space, which is formed by a section of shaft 7 configured as an external disk carrier for clutch D and, on the other hand, also inside a cylindrical space formed by shaft 6. On the one hand, clutch E is arranged at least, to a large extent, inside a cylindrical space, which is formed by a section of shaft 7 configured as an external disk carrier for clutch E and, on the other hand, also inside a cylindrical space formed by shaft 6, and also inside a cylindrical space formed by the section of shaft 2. And finally, clutch C is arranged at least, to a large extent, inside a cylindrical space, which is formed by a section of the shaft 1 configured as an external disk carrier for clutch C and also inside a cylindrical space formed by shaft 5 and hence also inside a cylindrical space formed by shaft 6 and/or shaft 2.

FIG. 4A shows a shift pattern of the multi-speed transmission according to the present invention shown in FIG. 4. In each gear, three gearshifting elements are engaged and two gearshifting elements are disengaged, wherein the gearshift logic is identical to FIG. 1A. Besides, this gearshift logic, the shift pattern also shows exemplary values for the respective transmission ratios i of the individual gear steps and the step jumps φ that can be derived from them. The specified transmission ratios i of the gear steps are derived from the (typical) stationary gear ratios of the four planetary gearsets RS1, RS2, RS3, RS4, of minus 2.13, minus 3.70, minus 3.05 and minus 2.07.

Figure 4B:
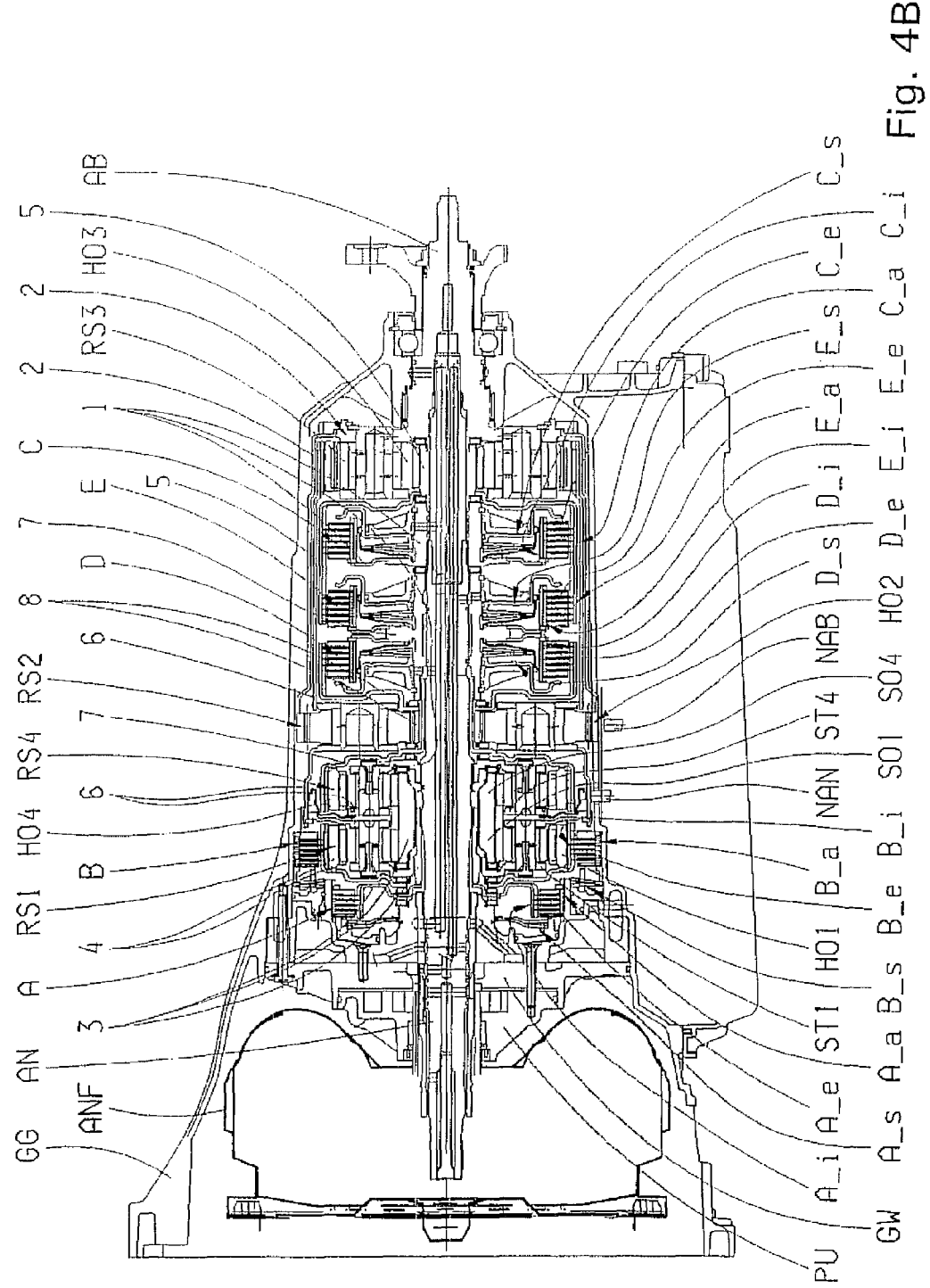
FIG. 4B is an exemplary detailed design of the multi-step transmission according to FIG. 4.

FIG. 4B shows an exemplary detailed design of the multi-speed transmission according to FIG. 4. The transmission, shown in FIG. 4B, is characterized by an extremely compact design. The second planetary gearset RS2 features a stationary gear ratio that is different from that of FIG. 4A, which is hereafter only "minus 4.00". Compared to FIG. 4, a starting element ANF configured as a hydrodynamic torque converter is included in the drawing, which is arranged in the force flow path between a drive motor of the transmission (not represented in detail) and the input shaft AN of the transmission. A torque converter of this known type can obviously be a torsional damper and/or a lockup clutch as well.

As can easily be seen in FIG. 4B, the spatial arrangement of the five gearshifting elements A to E differs from FIG. 4. Viewed from the drive of the transmission and/or from the starting element ANF, the three planetary gearsets RS1, RS4 and RS2 are arranged co-axially in this sequence immediately axially adjacent to one another. Like in FIG. 4, the planetary gearset RS3 is arranged on the side of the transmission opposite the drive of the transmission. As in FIG. 4, input shaft AN and output shaft AB are arranged co-axially to one another so that the input and output of the transmission are situated on opposite sides of the transmission.

Brake A, as the first gearshifting element of the transmission, is arranged on the side of the planetary gearset RS1 close to the drive facing the starting element and/or opposite to the fourth planetary gearset RS4. A disk pack of brake A, designated with A_l, is arranged adjacent to the planetary gearset RS1 on a diameter that approximately corresponds to the inner diameter of the ring gear HO1 of the first planetary gearset RS1. An inner disk carrier of brake A, designated with A_i, for accepting the inner toothed disks of the disk pack A_l, configured in this case as lining disks, is connected in a torsion-proof manner with the sun gears SO1, SO4 of the first and fourth planetary gearsets RS1, RS4 (shaft 3 of the transmission) and mounted radially on the input shaft AN. The two sun gears SO1, SO4 are configured, in this case, as one piece. An external disk carrier of brake A, designated with A_a, for accepting the outer toothed disk of the disk pack A_l configured, in this case, as steel disks, simultaneously functions as a channel plate for oil distribution and is screwed to the transmission housing GG via a housing wall GW. The inner disk carrier A_i is supported by way of an axial bearing on the outer disk carrier A_a, which is fixed to the transmission housing. At the same time, the wall GW forms the external wall of the transmission housing facing the starting element ANF and also accommodates an oil pump PU required for feeding pressure medium and lubricant into the transmission. A servo A_s of brake A for actuating its disk pack A_l is arranged on the side of the disk pack A_l opposite the planetary gearset RS1 and/or on the side facing the starting element ANF and is mounted in an axially shiftable manner on the outer disk carrier A_a, comprising a pressure chamber, a piston that acts on the disk pack A_l and a piston return element configured as a plate spring.

Brake B, as a second gearshifting element of the transmission, is arranged immediately adjacent to the first planetary gearset RS1 close to the drive wherein, viewed spatially, a disk pack designated with B_l is arranged radially above the ring gear HO1 of the first planetary gearset RS1. An inner disk carrier, designated with B_i of brake B for accepting the inner toothed disks of the disk pack B_l configured in this case as lining disks, forms a section of the shaft 4 of the transmission, is connected in a torsion-proof manner to the ring gear HO1 of the first planetary gearset RS1 and mounted axially between the inner disk carrier A_i of brake A and the carrier plate close to the drive of the carrier ST1 of the first planetary gearset RS1. An external disk carrier, designated with B_a, of brake B for accepting the outer toothed discs configured, in this case as steel disks, of the disk pack B_l, is integrated into the transmission housing GG. A servo B_s of brake B for actuating its disk pack B_l is arranged on the side of the disk pack B_l opposite the planetary gearset RS4 and/or on the side facing the drive element ANF and is mounted axially shiftable on the external disk carrier A_a of brake A and the transmission housing GG, comprising a pressure chamber, a piston acting on the disk pack B_i, and a piston return element configured as a plate spring.

As can also be seen from FIG. 4B, the three clutches D, E and C, viewed from the drive of the transmission, are arranged axially parallel between the second and third planetary gearset RS2, RS3. Clutch C is thus arranged as a third gearshifting element of the transmission adjacent to the third planetary gearset RS3; clutch D as a fourth gearshifting element adjacent to the second planetary gearset RS2, and clutch E as a fifth gearshifting element of the transmission axially between the clutches D and C. Each of the disk packs of the three clutches C, D, E is designated with C_l, D_l and/or E_l. These disk packs C_l, D_l, are arranged on the same diameter, which is advantageous for a common parts concept. Each of the inner disk carriers of the three clutches C, D, E for accepting the inner toothed disks of the respective disk pack C_l, D_l and/or E_l which, in this case, are configured as steel disks, is designated with C_l, D_i and/or E_l. Each of the external disk carriers of the three clutches C, D, E for accepting the outer toothed disks of the respective disk pack C_l, D_l or E_l which, in this case, are configured as lining disks, is designated with C_a, D_a, or E_a. Finally, each of the servos of the three clutches C, D, E for actuating their disk packs C_l, D_l, E_i is designated with C_s, D_s, E_s. Each of these servos C_s, D_s, E_s features a support disk, a piston acting on the respective disk pack, a pressure chamber acting on the piston, a piston return element configured as a plate spring, a baffle plate and a pressure equalizing chamber acting on the piston in order to compensate for the rotational pressure of the rotating pressure chamber.

The inner disk carrier C_i of clutch C forms a section of shaft 1 of the transmission and, according to the basic shift pattern (FIG. 4), is connected in a torsion-proof manner to the input shaft AN. In this example, by way of a suitable locking profile, this connection section is configured as a hub of the inner disk carrier C_i. The servo C_s of clutch C is mounted on the inner disk carrier C_i of clutch C in an axially shiftable manner and, viewed spatially, is arranged radially above the hub of the inner disk carrier C_i. The pressure chamber of the servo C_s, which is filled with pressure medium, is formed by the support disk of clutch C, which is axially fixed to the hub of the inner disk carrier C_i, by the piston of the servo C_s and by a section of the hub of the inner disk carrier C_i. The piston is sealed pressure medium-tight in an axially shiftable manner against the support disk and the hub of the inner disk carrier C_i. Viewed spatially, this pressure chamber is arranged radially below the disk pack C_l of clutch C. The piston of the servo C_s encompasses the disk-engaging piece of the inner disk carrier C_i in the axial and radial direction and actuates the assigned disk pack C_i in the direction of the second planetary gearset RS2 when the pressure chamber of the servo C_s is filled with pressure medium, against the reset force of the plate spring of the servo C_s. The plate spring is axially clamped between the piston and the baffle plate of the servo C_s, which rests axially against the hub of the inner disk carrier C_i. The pressure medium is fed into the pressure chamber of the servo C_s from the output side of the transmission. The depressurized pressure equalization chamber of the servo C_i that can be from the output side of the transmission filled with lubricant is formed by the baffle plate and piston of the servo C_s. The axially shiftable piston is sealed lubricant tight against the baffle plate. Viewed spatially, the pressure equalizing chamber of the servo C_s is arranged on the side of the piston of the servo C_s opposite the pressure chamber of the servo C_s, radially above the disk pack C_l of clutch C. Thus, the pressure equalizing chamber of the servo C_s is closer to the second planetary gearset RS2 than the pressure chamber of the servo C_s.

The external disk carrier C_a of clutch C and the external disk carrier E_a of clutch E, adjacent to clutch C, are configured as a common component and form a section of shaft 5 of the transmission and are connected in a torsion-proof manner according to the basic shift pattern (FIG. 4) to the sun gear SO3 of the third planetary gearset RS3, in this example by way of a welded connection. Geometrically, this common external disk carrier C_a/E_a is configured as a cylinder-shaped pot in whose cylindrical space clutch C is arranged completely, and clutch E at least predominantly.

The inner disk carrier D_i of clutch D and the inner disk carrier E_i of clutch E are executed as a common component and form the section of shaft 7 being connected torsion-proof to the ring gear HO4 of the fourth planetary gearset RS4 according to the basic shift pattern (FIG. 4). For this purpose in the illustrated exemplary embodiment, it is provided that the common inner disk carrier D_i/E_i has a hub that is connected to a cylinder-shaped sheet metal pot via a suitable locking profile. The sheet metal pot, in turn, forms another section of shaft 7. This steel pot is connected on its external diameter torsion-proof to the ring gear HO4 having a hub section, which runs centrically through the sun gear SO2 of the second planetary gearset RS2 in the axial direction, being connected positively to the hub of the common inner disk carrier D_i/E_i on the side of this planetary gearset RS2 opposite the fourth planetary gearset RS4.

Both the servo D_s of clutch D and the servo E_s of clutch E are mounted on the common inner disk carrier D_i/E_i in an axially shiftable manner. For this purpose, the hub of the common inner disk carrier D_i/E_i is divided in the middle into two equally long axial sections by a cylinder wall wherein, viewed spatially, the servo D_s is arranged radially above the hub section facing the planetary gearset RS2 and the servo E_s, viewed spatially, radially above the hub section of the common inner disk carrier D_i/E_i facing away from the planetary gearset RS2. Both servos D_S, E_s are constructively similar to the servo C_s of clutch C, described above in detail, the servo D_s being constructed in a mirror-inverted manner with respect to the servo C_s so that the servos C_s, E_s are actuated in opposite directions and actuating direction of the servos C_s, E_s in the same direction. Correspondingly, the detailed description of the servo C_s can be applied, likewise, to the two servos D_s, E_s and a further detailed description may be dispensed with at this point. It should also be pointed out that the (independently of one another) supply of pressure medium to the pressure chambers of the servos D_s, E_s of clutches D, E takes place, in this case, from the input side of the transmission, unlike the pressure medium supply to the pressure chamber of the servo C_s of clutch C.

Also included in the drawings of FIG. 4B, there is a rotational speed sensor NAN for the determination of the rotational speed of the input shaft AN. In the illustrated example, this input shaft speed (here also the turbine shaft speed of the torque converter ANF) is measured at the carrier ST4 of the fourth planetary gearset RS4 through the rotating sheet metal pot of shaft 6. Viewed spatially, the corresponding transmitter wheel (tooth wheel) is thus arranged radially between the ring gear HO4 of the fourth planetary gearset RS4 and the sheet metal pot of shaft 6, which overlaps this ring gear HO4 in the axial direction. In order to measure the rotational speed of the input shaft through the rotating sheet metal pot of shaft 6, this sheet metal pot is made of non-magnetic material or is provided with circumferentially distributed recesses and/or radial apertures in the area of the rotational speed sensor NAN. Also included in the drawings of FIG. 4B, there is a rotational speed sensor NAB for the determination of the rotational speed of the output shaft AB, viewed spatially, radially above the ring gear HO2 of the second planetary gearset RS2, whose outer diameter is configured correspondingly geometrically as a transmitter wheel (tooth wheel) for the rotational speed sensor NAB. Of course, the rotational speed sensor NAB may also be configured as a sensor unit for the determination of the rotational speed and rotational direction of the output shaft AB.

Figure 5:
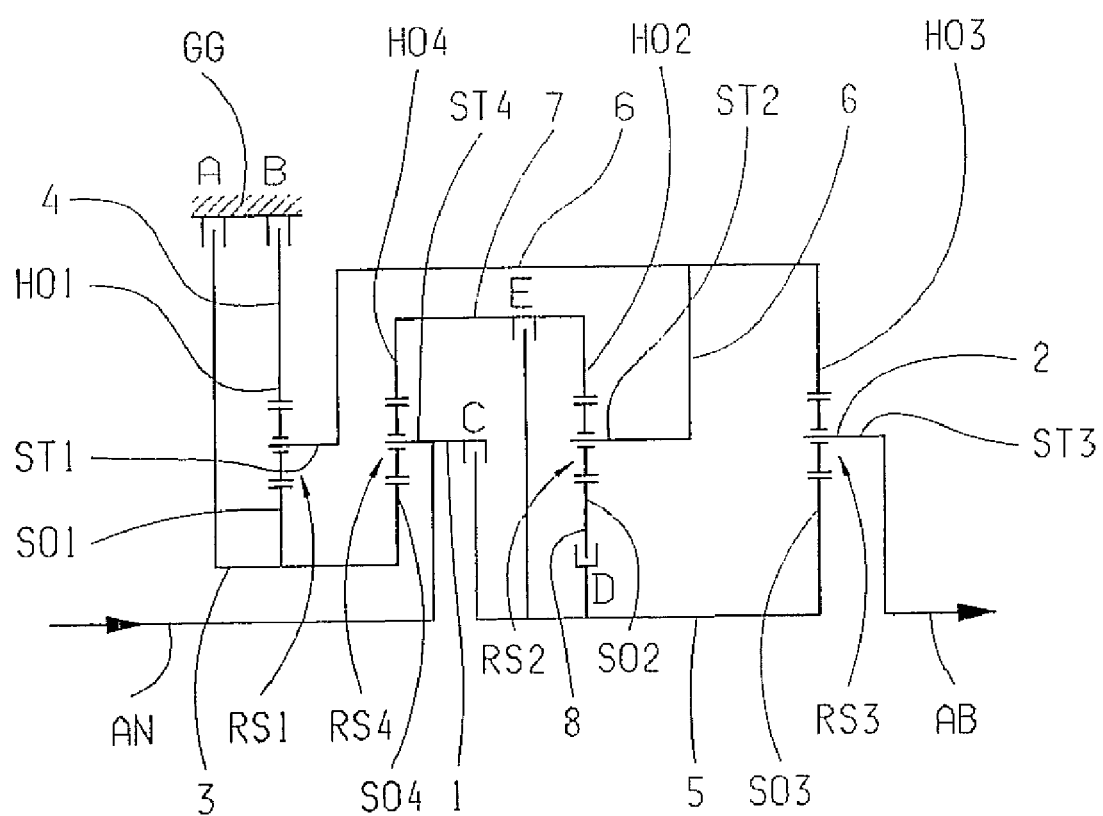
FIG. 5 is a schematic representation of an exemplary embodiment of a multi-step transmission in line with the fifth solution according to the present invention.

FIG. 5 shows an exemplary embodiment of a multi-speed transmission in line with the fifth solution, according to the present invention, again in schematic representation. Similar to FIG. 1, the transmission features the input shaft AN and the output shaft AB, four planetary gearsets R1, RS2, RS3, RS4 and five gearshifting elements A, B, C, D, E arranged in the transmission housing GG, as well as a total of at least eight rotatable shafts 1, 2, 3, 4, 5, 6, 7, 8. All four planetary gearsets RS1, RS2, RS3, RS4 are configured as minus-planetary gearsets and, in this exemplary embodiment, arranged consecutively co-axially in the sequence "RS1, RS4, RS2, RS3". The gearshifting elements are configured as brakes, for example, as frictionally engaged shiftable disk brakes. The gearshifting elements C, D and E are configured as clutches, for example, as frictionally engaged shiftable disk clutches. With these five gearshifting elements A to E, selective shifting of eight forward gears and at least one reverse gear can be realized.

With respect to the kinematic coupling of the individual elements of the four planetary gearsets RS1, RS2, RS3, RS4 to one another and to the input and output shafts AN, AB, the following is provided in the multi-speed transmission, according to FIG. 5: the carrier ST4 of the fourth planetary gearset RS4 and the input shaft AN are permanently connected to one another and form the first shaft of the transmission. The carrier ST3 of the third planetary gearset RS3 forms the second shaft of the transmission. The sun gear SO1 of the first planetary gearset RS1 and the sun gear SO4 of the fourth planetary gearset RS4 are permanently connected to one another and form the third shaft of the transmission. The ring gear HO1 of the first planetary gearset RS1 forms the fourth shaft 4 of the transmission. The sun gear SO3 of the third planetary gearset RS3 forms the fifth shaft 5 of the transmission. The carrier ST1 of the first planetary gearset RS1 and the carrier ST2 of the second planetary gearset RS2 and the ring gear HO3 of the third planetary gearset RS3 are permanently connected to one another and form the sixth shaft 6 of the transmission. The ring gear HO2 of the second planetary gearset RS2 and the ring gear HO4 of the fourth planetary gearset RS4 are permanently connected to one another and form the seventh shaft 7 of the transmission. Finally, the sun gear SO2 of the second planetary gearset RS2 forms the eighth shaft 8 of the transmission.

With respect to the kinematic coupling of the five gearshifting elements A to E to shafts 1 to 8 of the transmission, the following is provided in the multi-speed transmission, according to FIG. 5: brake A is arranged in the force flow path between the third shaft 3 and the transmission housing GG; brake B in the force flow path between the fourth shaft 4 and the transmission housing GG; clutch C in the force flow path between the first and fifth shaft 1, 5; clutch D in the force flow path between the fifth and eighth shaft 5, 8, and clutch E in the force flow path between the fifth and seventh shaft 5, 7.

The difference between the gearset patterns of the generic patent application DE 10 2005 002 337.1 and FIGS. 1 to 5 is thus found in the kinematic connection of the second planetary gearset RS2 to the other three planetary gearsets RS1, RS3, RS4 of the transmission.

In principle, the spatial arrangement of the gearshifting elements of the exemplary embodiment of the multi-speed transmission, according to the present invention shown in FIG. 5, is arbitrary and restricted only by the dimensions and external shape of the transmission housing GG. Thus in FIG. 5, the spatial arrangement of the two brakes, A, B was taken from FIG. 1. Correspondingly, the related statements made within the scope of the description of FIG. 1 are applicable to FIG. 5 as well.

As can also be seen from FIG. 5, viewed spatially, clutch C is arranged axially in an area between the fourth and second planetary gearset RS4, RS2, thus adjacent to the fourth planetary gearset RS4. This possibility was already indicated in the context of the description of FIG. 1. Correspondingly, in another embodiment of the transmission with the gearset pattern of FIG. 5, it can be provided that, viewed spatially, clutch C is arranged axially in an area between the second and third planetary gearset RS2, RS3 or also on the side of the third planetary gearset RS3 opposite the second planetary gearset RS2. As can also be seen from FIG. 5, viewed spatially, clutch E is also arranged axially in an area between the fourth and second planetary gearset RS4, RS2, thus adjacent to the second planetary gearset RS2.

It will readily be apparent to the person skilled in the art that the spatial location of clutch D, indicated in FIG. 5, in the area of the sun gear SO2 of the second planetary gearset RS2, is more suitable for a frictionally engaged shiftable conical clutch than for a multi-disk clutch. Correspondingly, if required, the person skilled in the art will also arrange clutch D axially adjacent to the second planetary gearset RS2. Constructively meaningful variations of the layout of the gearshifting elements will be described in detail below.

According to the spatial arrangement of the four gearsets, viewed in the axial direction in the sequence "RS1, RS4, RS2, RS3" in connection with the spatial arrangement of the five gearshifting elements A to E, shown in FIG. 5, the first shaft 1 of the of the transmission runs in sections centrically inside the third shaft 3. Only shaft 1 and/or the input shaft AN runs centrically in the axial direction through the first and fourth planetary gearset RS1, RS4. The fifth shaft 5 is the only shaft running centrically in the axial direction through the second planetary gearset RS2. The seventh shaft 7 completely overlaps clutch C, along its axial course, and forms a cylindrical space configured in sections as an outer disk carrier, inside whose cylindrical space clutch E is arranged. Clutch C is arranged at least, to a large extent, inside the cylindrical space, which is formed by a section of shaft 1, configured as an outer disk carrier for clutch C. Along its axial course, the sixth shaft 6 completely overlaps the fourth planetary gearset RS4, the shaft 7, the second planetary gearset RS2 and thus also clutches C and D. In this way, clutch C is also arranged inside a cylindrical space formed by shaft 7 and also outside a cylindrical space formed by shaft 6.

Furthermore, clutch E is also arranged inside a cylindrical space formed by shaft 6.

FIG. 5A shows a shift pattern for the multi-speed transmission, according to the present invention shown in FIG. 5. In each gear, three gearshifting elements are engaged and two gearshifting elements are disengaged, wherein the gearshift logic is identical to FIG. 1A. Besides this gearshift logic, the shift pattern also shows exemplary values for the respective transmission ratios i of the individual gear steps and step jumps φ that are derived from them. The specified transmission ratios i are derived from the (typical) stationary gear ratios of the four planetary gearsets RS1, RS2, RS3, RS4 of minus 2.115, minus 1.550, minus 3.700 and minus 2.065.

Based on the shift pattern according to FIG. 5, two exemplary component layout variations for this transmission, according to the present invention, will be described in detail below by way of the FIGS. 5B and 5C. In doing so, the first and the second gearshifting elements A, B are each configured as multi-disk brakes and the third, fourth and fifth gearshifting elements C, D, E are each configured as exemplary multi-disk clutches. Each of the disk packs with inner and outer disks of the gearshifting elements A, B, C, D, E is designated with A_l, B_l, C_l D_l and/or E_l; each of the inner disk carriers with A_i, B_i, C_i, D_i and/or E_i; each of the outer disk carriers with A_a, B_a, C_a, D_a and/or E_a and, in a highly simplified schematic representation, each of the servos for actuating the gearshifting element with A_s, B_s, C_s, D_s and/or E_s. In the known manner, all servos A_s to E_s can feature a pressure chamber, a piston acting on the respective disk pack A_l to E_l, as well as a piston return element configured as a plate spring or a ring-shaped pack of spiral springs connected in parallel, the servos C_s to E_s of the three clutches C to E can also feature a dynamic pressure equalization to compensate for the rotatory pressure of the respectively rotating pressure chamber. Furthermore, in FIGS. 5B and 5C, a known hydrodynamic torque converter is included in the drawing with an integrated lockup clutch, which is arranged as the starting element ANF of the transmission in the force flow path between a drive motor of the transmission (not described in detail) and the input shaft AN of the transmission. The input shaft AN and an output shaft AB are arranged co-axially to one another so that input and output of the transmission are located on opposite sides of the transmission. The first and fourth planetary gearsets RS1, RS4 are arranged immediately adjacent to one another in both component layout variations, the first planetary gearset RS1 facing the input element ANF and/or the drive motor.

Figure 5B:
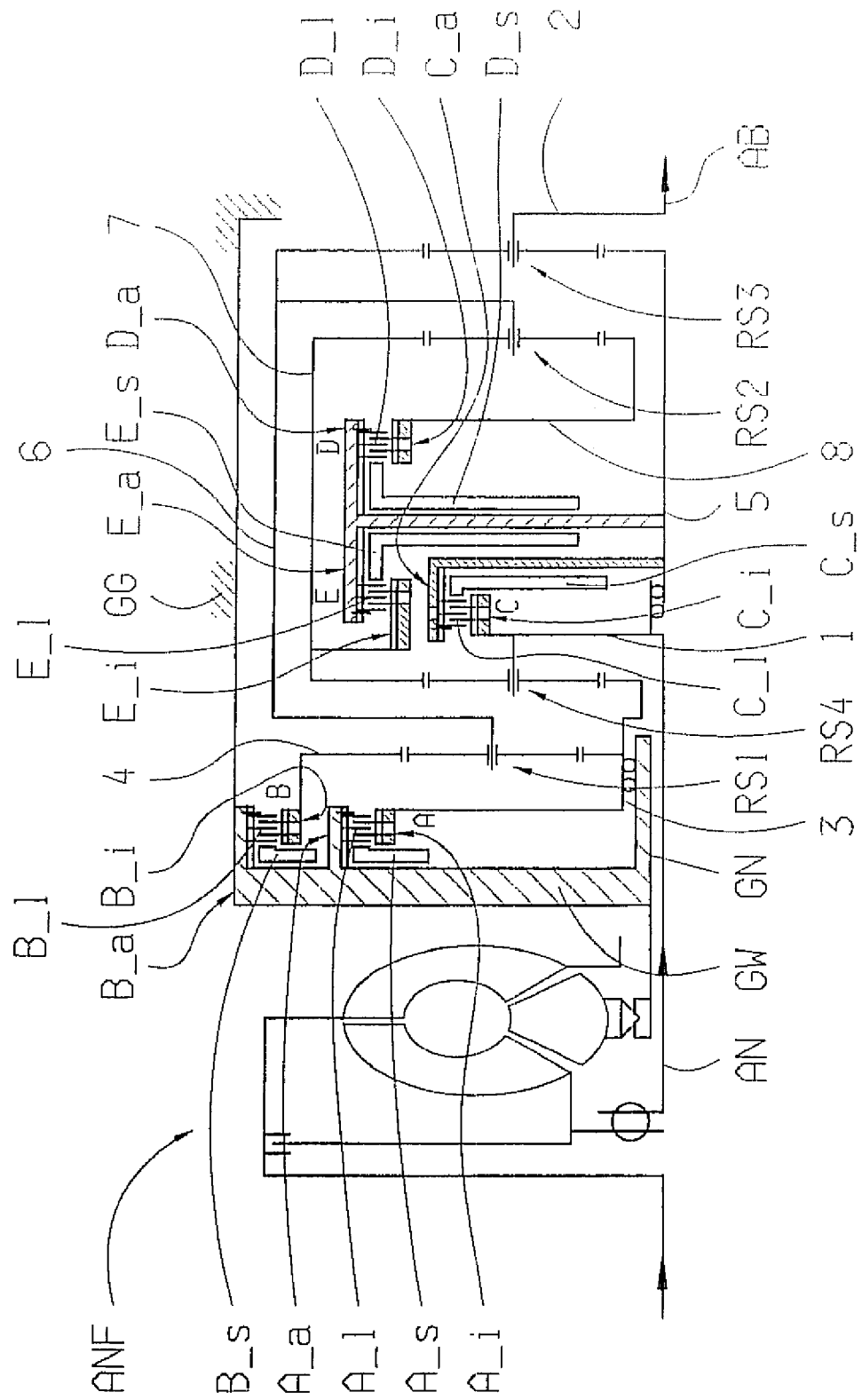
FIG. 5B is a first exemplary component layout variant for the multi-step transmission according to FIG. 5.

FIG. 5B now shows the first exemplary component layout variation for the multi-speed transmission, according to FIG. 5. Similar to FIG. 5, the two brakes A, B are arranged on the side of the transmission close to the drive, near the first planetary gearset RS1, situated close to the drive. Unlike FIG. 5, viewed spatially, brake A is hereafter basically arranged at least radially below brake B. Brake A is thus arranged on the side of the first planetary gearset RS1 facing the starting element ANF and/or opposite the fourth planetary gearset RS4. The disk pack A_l of brake A is arranged axially adjacent to the planetary gearset RS1 on a diameter that corresponds approximately to the inner diameter of the ring gear of the first planetary gearset RS1. The inner disk carrier A_i of brake A for accepting the inner toothed disks of the disk pack A_l, for example configured as lining disks, is connected in a torsion-proof manner to the sun gears of the first and fourth planetary gearset RS1, RS4 and forms a section of the third shaft 3 of the transmission and is mounted radially on a hub GN attached to the transmission housing. The outer disk carrier A_a of brake A for accepting the outer toothed disks of the disk pack A_l, for example configured as steel disks, is integrated into the housing wall GW that is attached to the transmission housing. The housing wall GW also forms the outer wall of the transmission housing GG facing the starting element. The servo A_s of brake A for actuating the disk pack assigned to the brake is arranged on the side of the disk pack A_l opposite the planetary gearset RS1 and/or the side facing the starting element ANF and mounted in an axially shiftable manner on the outer disk carrier A_a and/or the housing wall GW.

Brake B is also arranged in the immediate proximity of the first planetary gearset RS1, which is close to the drive. The disk pack B_l of brake B, viewed spatially, is arranged at least to a large extent radially above the disk pack A_l of brake A, thus on a diameter larger than the first planetary gearset RS1. The inner disk carrier B_i of brake B for accepting the inner toothed disks of the disk pack B_l, configured in this case, for example as lining disks, forms a section of the fourth shaft 4 of the transmission and, according to the basic shift pattern, is connected in a torsion-proof manner with the ring gear of the first planetary gearset RS1. The outer disk carrier B_a of brake B for accepting the outer toothed disks of the disk pack B_l, configured in this case for example as steel disks, is integrated into the housing wall GW that is attached to the transmission housing. The servo B_s of brake B for actuating the disk pack B_l assigned to brake is arranged on the side of the disk pack B_l opposite the planetary gearset RS4 and/or on the side facing the starting element ANF and is mounted axially shiftably on the outer disk carrier B_a of brake B and/or on the housing wall GW and, viewed spatially, is arranged basically radially above the servo A_s of brake A. It will be readily apparent to the person skilled in the art that the supply of pressure medium to the servos A_s, B_s of the two brakes A, B, via corresponding bores and/or channels inside the housing wall GW, can be realized in a relatively simple manner.

As can also be seen in FIG. 5B, viewed spatially, three clutches D, E and C are arranged axially between the fourth and second planetary gearset RS4, RS2. The two clutches D and E thus form a preassembled group of components with disk packs D_l, E_l, arranged axially parallel, clutch C, viewed spatially, being arranged approximately radially under the disk pack E_l of the clutch E and the disk packs E_l, C_l of clutches E, C being arranged adjacent to the fourth planetary gearset RS4 and the disk pack D_l of clutch B adjacent to the second planetary gearset RS2.

For the two clutches D, E, a common cylindrical external disk carrier D_a/E_a is provided, which accepts the outer toothed disks of the disk packs D_l, E_l which, in this case, are configured as steel disks and forms a section of the fifth shaft 5 of the transmission and, according to the basic transmission diagram, is connected in a torsion-proof manner to the sun gear of the third planetary gearset RS3. Furthermore, the servos D_s, E_s of the two clutches D, E are mounted axially shiftable on this common external disk carrier D_a/E_a and both rotate correspondingly and permanently at the rotational speed of shaft 5, both servos D_s, E_s being arranged immediately adjacent to one another between the two disk packs D_l, E_l and only separated from one another by a lateral area of the common external disk carrier D_a/E_a. Accordingly, the servo D_s actuates the disk pack D_l assigned to it axially in the direction of the second planetary gearset RS2 when engaging clutch D, whereas the servo E_s actuates the disk pack E_l assigned to it axially in the direction of the fourth planetary gearset RS4 when engaging clutch E. The inner disk carrier D_i of clutch D for accepting the inner toothed disks of the disk pack D_l, which are configured in this case as lining disks, forms a section of the eighth shaft 8 of the transmission and, according to the basic shift pattern, is connected in a torsion-proof manner to the sun gear of the second planetary gearset RS2. The inner disk carrier E_i of clutch E for accepting the inner toothed disks of the disk pack E_i, configured in this case as lining disks, forms a section of the seventh shaft 7 of the transmission and, according to the basic shift pattern, is connected in a torsion-proof manner to the ring gears of the second and fourth planetary gearset RS2, RS4.

As already indicated, viewed spatially, clutch C is arranged inside a cylindrical space, which is formed by the external disk carrier E_a of clutch E and thus by the section of the common external disk carrier D_a I E_a assigned to clutch E. The external disk carrier C_a of clutch C is thus configured as a cylinder-shaped pot that is disengaged in the direction of the planetary gearset RS4. The pot is arranged radially below the inner disk carrier E_i of clutch E and adjacent to the servo E_s of clutch E. The disk pack C_l and the servo C_s of clutch C, which is assigned to this disk pack, are arranged inside this external disk carrier C_a, the external disk carrier C_a accepting in this case the outer toothed steel disks of this disk pack C_l and the servo, which is mounted axially shiftable on the external disk carrier C_a, actuating the disk pack C_l axially in the direction of the fourth planetary gearset R54 when engaging clutch C. Kinematically, the external disk carrier C_a of clutch C is assigned to the fifth shaft 5 of the transmission; the servo C_S correspondingly rotates constantly at the rotational speed of the sun gear of the third planetary gearset RS3. The inner disk carrier C_i of clutch C for accepting the inner toothed disks of the disk pack C_l, configured in this case as lining disks, forms a section of the first shaft 1 of the transmission and, according to the basic shift pattern, is connected in a torsion-proof manner to the carrier of the fourth planetary gearset RS4 and the input shaft AN. Also indicated in FIG. 5b is a bearing between the external disk carrier C_a and/or the shaft 5 and the input shaft AN and/or shaft 1 of the transmission. It will readily be apparent to the person skilled in the art that the supply of pressure medium and lubricant to all three clutches C, D, E can be realized in a relatively simple manner, via corresponding bores and/or channels of the shaft 57 into which the pressure medium and/or lubricant is in turn fed via only two rotating feeds for the pressure medium and/or lubricant (optionally via the input shaft AN or output shaft AB).

Figure 5C:
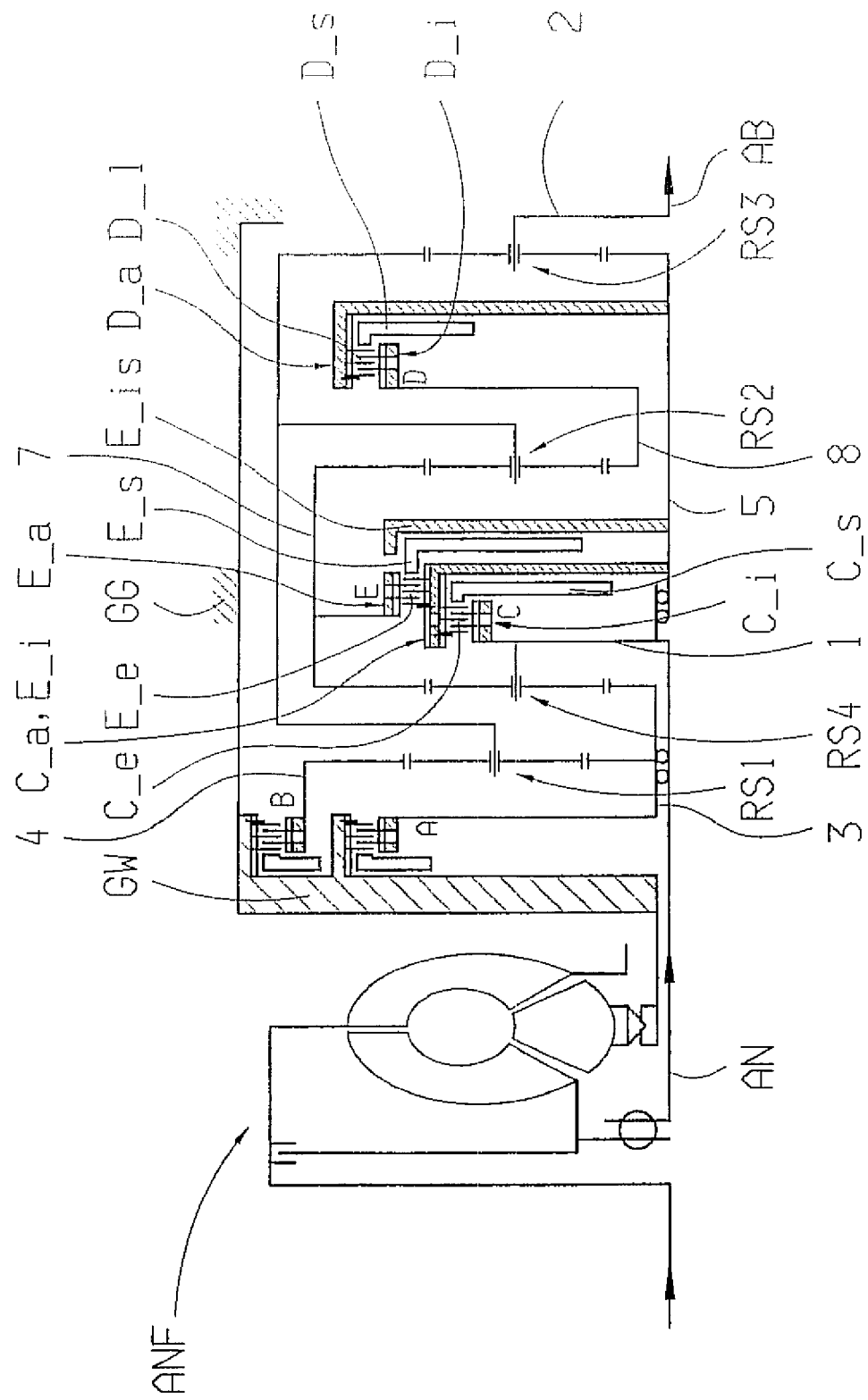
FIG. 5C is a second exemplary component layout variant for the multi-step transmission according to FIG. 5.

Finally, FIG. 5C shows the second exemplary component layout variation of the multi-speed transmission according to FIG. 5. The spatial arrangement and construction of the two brakes A, B are taken unchanged from FIG. 5B, so that a description may be dispensed with at this point. Similar to FIG. 5, in FIG. 5C, the two clutches C and E are arranged axially between the two planetary gearsets RS4 and RS2, the clutch D, however, hereafter arranged axially between the planetary gearsets RS2 and RS3.

As can be seen from FIG. 5C, a common cylindrical disk carrier is hereafter provided for the two clutches C and E, and is configured as an external disk carrier C_a for clutch C and as an inner disk carrier E_i for clutch E. Correspondingly, on the inner diameter of the cylindrical section of this common disk carrier C_a/E_i, a suitable locking profile is provided for accepting the external disks of the disk pack C_l of clutch C. The disks are configured in this case as steel disks and on the outer diameter of the cylindrical sections of this common disk carrier C_a/E_i, a suitable locking profile is provided for accepting the inner disks of the disk pack E_l of clutch E. The disks are configured in this case as steel disks. The disk packs C_l and E_l are thus arranged, viewed spatially, approximately, that is at least in part, radially one above the other. The inner disk carrier C_i of clutch C for accepting the inner disks of the disk pack C_l configured in this case as lining disks, forms a section of the first shaft of the transmission and, according to the basic shift pattern, is connected in a torsion-proof manner to the carrier of the fourth planetary gearset RS4 and the input shaft AN. The external disk carrier E_a of clutch E for accepting the outer disks of the disk pack E_l of clutch E, the disks being configured in this case as lining disks, forms a section of the seventh shaft 7 of the transmission and is connected in a torsion-proof manner to the ring gears of the second and fourth planetary gearsets RS2, RS4. The disk pack C_l and the servo C_s assigned to this disk pack C_l are arranged inside the cylindrical space, which is formed by the common disk carrier C_a l E_, the servo C_s actuating the disk pack C_l assigned to it axially in the direction of the fourth planetary gearset RS4 when engaging clutch C. The servo E_s assigned to the disk pack E_l of clutch E is basically arranged on the side of the common disk carrier C_a/E_i opposite the disk pack C_l and/or the fourth planetary gearset RS4 and in the exemplary embodiment shown, is mounted axially shiftable on a supporting disk E_i and/or on the common disk carrier C_a/E_i. This supporting disk E_i, on its part, is axially attached opposite the common disk carrier C_a/E_i. When engaging clutch E, the servo E_s also actuates the disk pack E_s assigned to it axially in the direction of the fourth planetary gearset RS4. Kinematically, the common disk carrier C_a/E_i and the supporting disk E_i are assigned to the fifth shaft 5 of the transmission and, according to the basic shift pattern, the common disk carrier is connected in a torsion-proof manner to the sun gear of the third planetary gearset RS3. Thus, both servos C_s, E_s, constantly rotate at the rotational speed of the sun gear of the third planetary gearset RS3.

As can be further seen in FIG. 5C, the external disk carrier D_a of clutch D is configured as a cylindrical pot that is open in the direction of the second planetary gearset RS2 and kinematically is, likewise, assigned to the fifth shaft 5 of the transmission and, according to the basic shift pattern, is connected in a torsion-proof manner to the sun gear of the third planetary gearset RS3. The inner disk carrier D_i of clutch D, which accepts the inner disks configured in this case as lining disks of the disk pack D_l, forms a section of the eighth shaft 8 of the transmission and, according to the basic shift pattern, is connected to the sun gear of the second planetary gearset RS2. The disk pack D_l and the servo D_s of clutch D, which is assigned to this disk pack D_l, are arranged inside a cylindrical space that is formed by the external disk carrier D_a. When engaging, the servo C_s, which constantly rotates at the rotational speed of the sun gear of the third planetary gearset RS3, actuates the disk pack D_l assigned to it axially in the direction of the second planetary gearset RS2.

It will be readily apparent to the person skilled in the art that the supply of the pressure medium and lubricant to all three clutches C, D, E can be realized in a relatively simple manner by way of corresponding bores and/or channels in shaft 5 into which the pressure medium or lubricants can be fed, via rotating pressure medium, or lubricant feeds, via the input shaft AN or output shaft AB.

Figure 6:
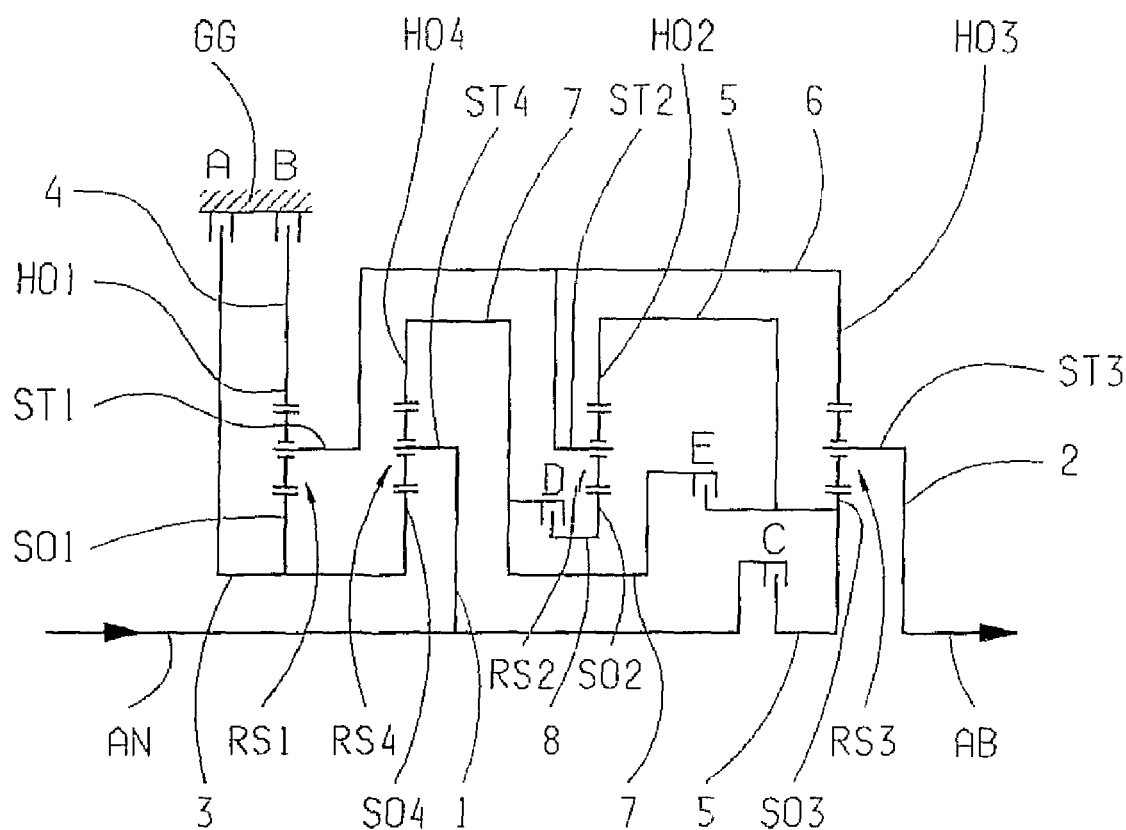
FIG. 6 is a schematic presentation of an exemplary embodiment of a multi-step transmission in line with the sixth solution according to the present invention.

FIG. 6 shows an exemplary embodiment of a multi-speed transmission in line with the sixth solution, according to the present invention, again in schematic representation. Similar to FIG. 1, the transmission features the input shaft AN and the output shaft AB, four planetary gearsets RS1, RS2, RS3, RS4 and five gearshifting elements A, B, C, D, E arranged in the housing GG of the transmission, as well as a total of at least eight rotatable shafts 1, 2, 3, 4, 5, 6, 7, 8. All four planetary gearsets RS1, RS2, RS3, RS4 are configured as simple minus-planetary gearsets and, in this exemplary embodiment, are arranged in an axial direction, consecutively co-axially in the sequence "RS1, RS4, RS2, RS3". The gearshifting elements A and B are configured as brakes, executed as frictionally engaged shiftable disk brakes. The gearshifting elements C, D and E are configured as clutches, executed as frictionally engaged shiftable disk clutches. With these five gearshifting elements A to E, selective shifting of eight forward gears and at least one reverse gear can be realized.

With respect to the kinematic coupling of the individual elements of the four planetary gearsets RS1, RS2, RS3, RS4 to one another and to the input and output shaft AN, AB, the following is provided in the multi-speed transmission, according to FIG. 5: the carrier ST4 of the fourth planetary gearset RS4 and the input shaft AN are permanently connected to one another and form the first shaft 1 of the transmission. The carrier ST3 of the third planetary gearset RS3 forms the second shaft 2 of the transmission. The sun gear SO1 of the first planetary gearset RS1 and the sun gear SO4 of the fourth planetary gearset RS4 are permanently connected to one another and form the third shaft 3 of the transmission. The ring gear HO1 of the first planetary gearset RS1 forms the fourth shaft 4 of the transmission. The ring gear HO2 of the second planetary gearset RS2 and the sun gear SO3 of the third planetary gearset RS3 are permanently connected to one another and form the fifth shaft 5 of the transmission. The carrier ST1 of the first planetary gearset RS1 and the carrier ST2 of the second planetary gearset RS2 and the ring gear HO3 of the third planetary gearset RS3 are permanently connected to one another and form the sixth shaft 6 of the transmission. The ring gear HO4 of the fourth planetary gearset RS4 forms the seventh shaft 7 of the transmission. Finally, the sun gear SO2 of the second planetary gearset RS2 forms the eighth 8 shaft of the transmission.

With respect to the kinematic coupling of the five shifting elements A to E with shafts 1 to 8 of the transmission, the following is provided in the case of the multi-speed transmission according to FIG. 6: brake A is arranged in the force flow path between the third shaft 3 and the transmission housing GG; brake B in the force flow path between the fourth shaft 4 and the transmission housing GG; clutch C in the force flow path between the first and fifth shaft 1, 5; clutch D in the force flow path between the seventh and eighth shaft 7, 8, and clutch E in the force flow path between the fifth and seventh shaft 5, 7.

The difference between the gearset patterns of the generic patent application DE 10 2005 002 337.1 and FIGS. 1-6 is found in the kinematic connection of the second planetary gearset RS2 to the other three planetary gearsets RS1, RS3, RS4 of the transmission.

In principle, the spatial arrangement of the gearshifting elements of the exemplary embodiment of the multi-speed transmission, according to the present invention shown in FIG. 6, is arbitrary and restricted only by the dimensions and external shape of the transmission housing GG. In FIG. 6, the spatial arrangement of the two brakes A, B is taken from FIG. 1, Correspondingly, the related statements made within the scope of the description of FIG. 1 are applicable to FIG. 6 as well. The spatial arrangement of the three clutches C, D, E was taken from FIG. 4, for example. Correspondingly, the related statements made within the scope of the description of FIG. 4 are also applicable to FIG. 6. Constructive variations of the arrangement of the gearshifting elements will be described in detail below.

According to the spatial arrangement of the four planetary gearsets viewed in the axial direction in the sequence "RS1, RS4, RS2, RS3" in connection with the spatial arrangement of the five gearshifting elements A to E shown in FIG. 6, the first shaft of the transmission runs centrically in sections inside the third shaft 3, in sections centrically inside the seventh shaft 7, and in sections centrically inside the seventh shaft 7 and in sections also inside the fifth shaft 5. Only shaft 1 and/or the input shaft AN runs centrically through the first and fourth planetary gearset RS1, RS4. In turn, the seventh shaft runs centrically in sections inside the eighth shaft 8 and, in so doing, runs centrically in the axial direction through the second planetary gearset RS2. Two shafts, shaft 1 and/or the input shaft and shaft 7 thus run centrically in the axial direction through the second planetary gearset RS2. Clutch D is arranged at least in part inside a cylindrical space that is formed by a section of shaft 7 configured as an external disk carrier for clutch D. Clutch E is arranged at least, to a large extent, inside a cylindrical space that is formed by another section of shaft 7 configured as an external disk carrier for clutch E. In turn, along its axial course, the fifth shaft 5 completely overlaps clutch E. Along its axial course, the sixth shaft 6 completely overlaps the fourth planetary gearset RS4, the shaft 7, the clutch D, the second planetary gearset RS2 and the shaft 5, and thus also clutches E and C. Hence, clutch E is also arranged inside a cylindrical space formed by shaft 5 and also inside a cylindrical space formed by shaft 6. Furthermore, clutch C is also arranged inside a cylindrical space formed by shaft 5 and also inside a cylindrical space formed by shaft 6.

FIG. 6A shows a shift pattern of the multi-speed transmission according to the present invention shown in FIG. 6. In each gear, three gearshifting elements are engaged and two gearshifting elements are disengaged, wherein the gearshift logic is identical to FIG. 1A. Besides the gearshift logic, exemplary values for the transmission ratios i of the individual gear steps, as well as the step jumps φ that can be derived from them can be seen from the shift pattern. The specified transmission ratios are derived from the (typical) stationary gear ratios of the four planetary gearsets RS1, RS2, RS3, RS4 of minus 1.55, minus 1.55, minus 3.70 and minus 1.70.

Based on the shift pattern according to FIG. 6, three exemplary component layouts for the transmission, according to the present invention, will be described in more detail by way of the FIGS. 6B, 6C and 6D. In doing so, each of the first and second gearshifting elements A, B is configured as a multi-disk brake and each of the third, fourth and fifth gearshifting elements C, D, E as a multi-disk clutch. Each of the disk packs with inner and external disks of the gearshifting elements A, 8, C, D, E is designated with A_l, B_l, C_l, C_l and/or E_l; each of the inner disk carriers with A_i, B_i, C_i, D_i and/or E_i; each of the external disk carriers with A_a, B_a, C_a, D_a and/or E_a and, in a highly simplified schematic representation, each of the servos for actuating the gearshifting element with A_s, B_s, C_s, D_s and/or E_s. In the known manner, all servos A_s to E_s can feature a pressure chamber, a piston acting on the respective disk pack A_l to E_l, as well as a piston return element configured as a plate spring or a ring-shaped pack of spiral coils connected in parallel. The servos C_s to E_s of the three clutches C to E also feature a dynamic pressure equalization to compensate for the rotatory pressure of the respective rotating pressure chamber. A known hydrodynamic torque converter with integrated lockup clutch is additionally included in the drawings of FIGS. 6B, 6C and 6D, which is arranged as an exemplary starting element ANF of the transmission in the force flow path, between a drive motor of the transmission (not described in detail) and the input shaft AN of the transmission. The input shaft AN and the output shaft AB are arranged co-axially to one another in the example so that input and output of the transmission are on opposite sides of the transmission. The first and fourth planetary gearset RS1, RS4 are arranged immediately adjacent to one another in all three component layout variations, the first planetary gearset RS1 facing the starting element AN and/or the drive motor.

Figure 6B:
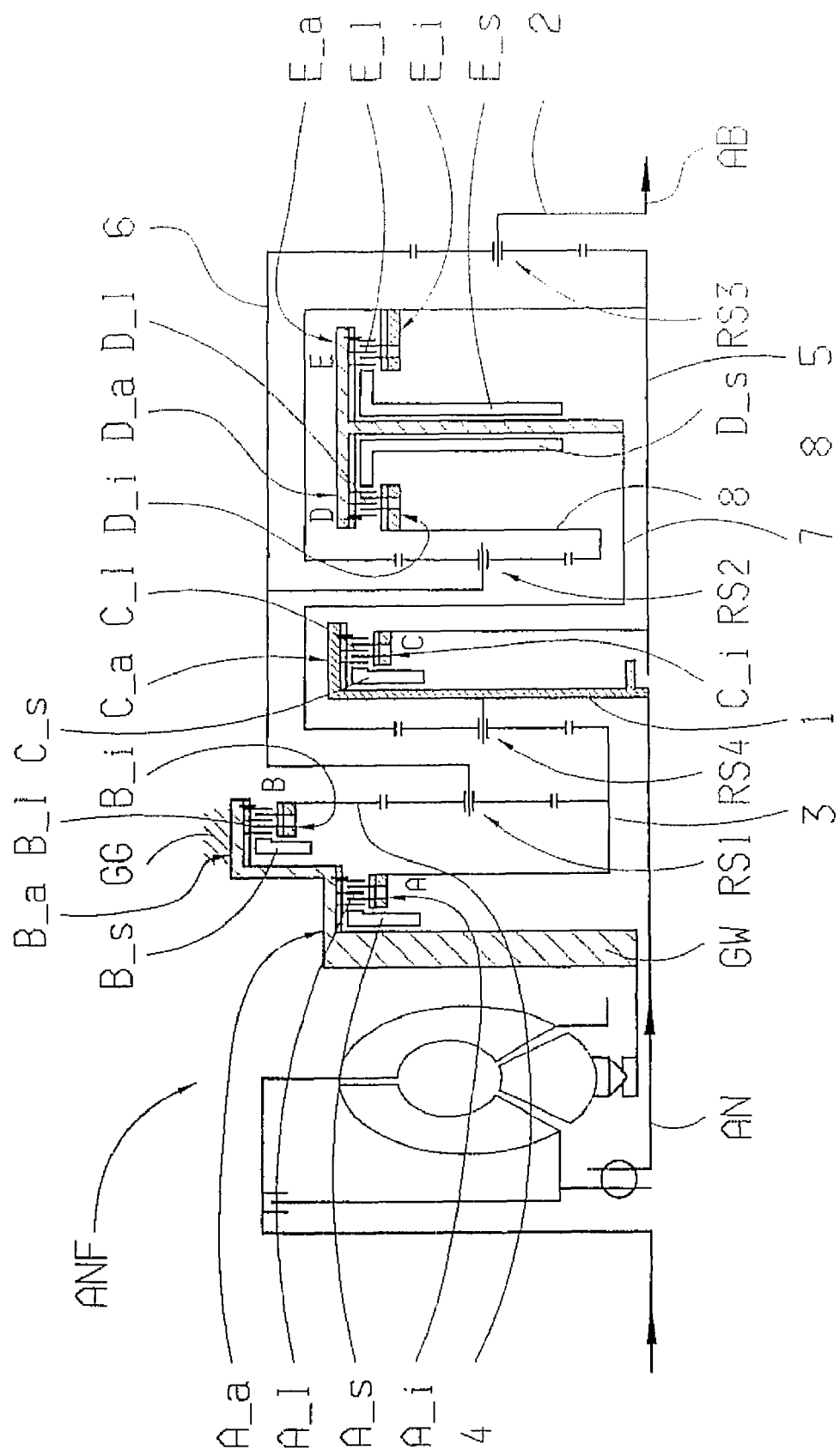
FIG. 6B is a first exemplary component layout variant for the multi-step transmission according to FIG. 6.

FIG. 6B now shows the first exemplary component layout variation for the multi-speed transmission according to FIG. 6. The spatial arrangement and constructive embodiment of the two brakes A and B is, to a large extent, taken from FIG. 4B. These two brakes are arranged on the side of the transmission facing the drive motor and/or the external starting element ANF, immediately adjacent to the first planetary gearset RS1. The two brakes A, B are thus arranged basically axially parallel, the brake B, however, on a larger diameter than brake A. Viewed spatially, brake B is arranged approximately radially above the first planetary gearset RS2, the inner disk carrier B_l of brake B, as a section of the shaft 4 of the transmission, being connected to the ring gear of this planetary gearset RS1. Viewed spatially, brake B is arranged approximately on the diameter of the ring gear of the planetary gearset RS1 on the side of the latter facing the drive of the transmission and thus closer to the input drive than brake B. The inner disk carrier A_i of brake A, as a section of the shaft 3 of the transmission, is connected to the sun gears of the planetary gearsets RS1 and RS4. The external disk carriers A_a, B_a of the two brakes are both integrated into the housing wall GW, which is close to the drive and connected to the housing GG. The servos A_s, B_s of the two brakes A, B are mounted axially shiftable in this housing wall and actuate the respective disk pack A_l, B_l assigned to them when engaging the respective brake A, B axially in the direction of the planetary gearsets.

Unlike FIG. 6, in FIG. 6B, clutch C is arranged in an area axially between the planetary gearsets RS4 and RS2, thus immediately axially adjacent to the planetary gearset RS4. The external disk carrier C_a of clutch C is configured as a cylindrical pot open in the direction of the planetary gearset RS2, inside which are arranged the disk pack C_l and the servo C_s of clutch C that is assigned to the disk pack C_l. Kinematically, the exterior disk carrier C_a is assigned to shaft 1 of the transmission and connected to the carrier of the planetary gearset RS4 and the input shaft AN of the transmission. Correspondingly, the servo C_s rotates permanently at the rotational speed of the input shaft AN and actuates the disk pack C_l assigned to it when engaging clutch C axially in the direction of the planetary gearset RS2. The inner disk carrier C_i is kinematically assigned to shaft 5 of the transmission connected to the sun gear of the planetary gearset RS3 and the ring gear of the planetary gearset RS2. It will readily be apparent to the person skilled in the art that the supply of pressure medium and lubricant to clutch C can be constructed in a very simple manner, via corresponding bores and/or channels in the input shaft AN, and only one rotating pressure medium and/or lubricant feed.

Unlike FIG. 6, in FIG. 6B, clutch D and E form a preassembled group of components and arranged axially between the planetary gearsets RS2 and RS3. For these two clutches D, E, a common external disk carrier D_a/E_a is provided, which is kinematically assigned to the shaft and connected to the ring gear of the planetary gearset RS4. Geometrically, this common exterior disk carrier D_a/D_a is configured as a cylindrical pot open at both ends, with a bottom arranged approximately in the center of the pot. Clutch D is arranged on the side of this pot bottom facing the planetary gearset RS2 and the clutch E on the side of this pot bottom facing the planetary gearset RS4, each inside the cylindrical space formed by the exterior disk carrier D_a/E_a. The servos D_s, E_s of the two clutches D, E are each adjacent to the pot bottom and are both arranged axially shiftable on the common exterior disk carrier D_a/E_a so that the servo D_s actuates the disk pack D_l assigned to it axially in the direction of the planetary gearset RS2 when engaging clutch D so that the servo E_s actuates the disk pack E_l assigned to it axially in the direction of the planetary gearset RS2 when engaging clutch E. Both servos D_s, E_s thus rotate permanently at the rotational speed of the shaft 7 and/or the rotational speed of the ring gear of the planetary gearset RS4. The inner disk carrier D_i of clutch D is kinematically assigned to shaft 8 and connected to the sun gear of the planetary gearset RS2. The inner disk carrier E_i of clutch E is kinematically assigned to shaft 5 and connected to the sun gear of the planetary gearset RS3 and the ring gear of the planetary gearset RS2. It will readily be apparent to the person skilled in the art that the pressure medium and lubricant supply to the two clutches D, E can be realized in a relatively simple manner, via corresponding bores and/or channels in shaft 5, into which in turn the pressure medium and/or lubricant can be supplied through rotating pressure medium and/or lubricant feeds, optionally via the input shaft AN or output shaft AB.

Figure 6C:
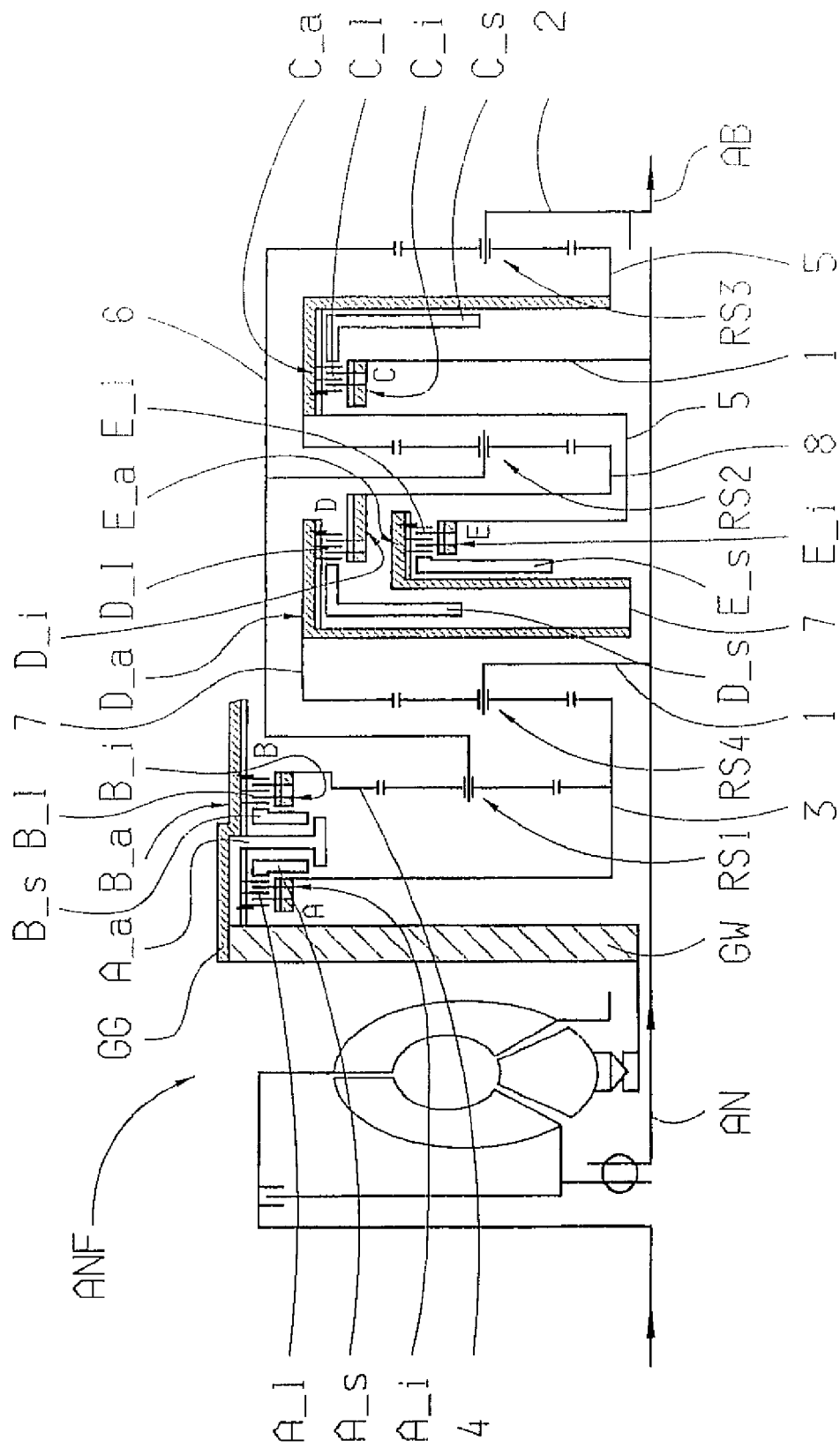
FIG. 6C is a second exemplary component layout variant for the multi-step transmission according to FIG. 6.

FIG. 6C shows the second exemplary component layout variation of the multi-speed transmission according to FIG. 6. The spatial arrangement of the two brakes A, B axially parallel on the same diameter corresponds to their arrangement in FIG. 6. As a constructive detail, an external disk pack A_a of brake A is provided, which is inserted in a torsion-proof manner into the transmission housing GG from the side facing the input drive of the transmission and which accepts both the disk pack A_l and the servo A_s of brake A that is assigned to this disk pack A_l and the servo B_s of brake B that is assigned to the disk pack B_l. The external disk carrier B_a of brake B is integrated into the transmission housing GG. The two servos A_s, B_s, which are mounted axially shiftable on the external disk carrier A_a, are also arranged immediately axially parallel and are only separated from one another by a lateral area of this external disk carrier A_a. Correspondingly, the servo A_s actuates the disk pack A_l assigned to it when engaging brake A axially in the direction opposite the planetary gearsets and/or axially in the direction of the external housing wall GW facing the input drive of the transmission. Correspondingly, the servo B_s actuates the disk pack B_l assigned to it when engaging brake B axially in the direction of the planetary gearsets.

Unlike FIG. 6, in FIG. 6C, only clutch C is arranged axially between the planetary gearsets RS2 and RS3, thus immediately axially adjacent to the planetary gearset RS3. The external disk carrier C_a of clutch C is configured as cylindrical pot open in the direction of the planetary gearset RS2, inside which the disk pack C_l and the servo C_s of clutch C assigned to this disk pack C_l, are mounted. Kinematically, the external disk carrier C_a is assigned to shaft 5 of the transmission and correspondingly connected to the sun gear of the planetary gearset RS3 and the ring gear of the planetary gearset RS2. Correspondingly, the servo C_s, which is mounted axially shiftable on the external disk carrier C_a, permanently rotates at the rotational speed of shaft 5 and actuates the disk pack C_l assigned to it when engaging clutch C axially in the direction of the planetary gearset RS2. The inner disk carrier C_i is kinematically assigned to shaft 1 of the transmission and correspondingly connected to the carrier of the planetary gearset RS4 and the input shaft AN of the transmission. The supply of pressure medium and lubricant to clutch C can be realized in a very simple manner, via corresponding bores and/or channels in the input shaft AN, and only one rotating pressure medium feed.

As can further be seen in FIG. 6C, unlike in FIG. 6, clutches D and E comprise a group of components that are arranged axially between the planetary gearsets RS4 and RS2. Viewed spatially, clutch E is thus arranged completely within a cylindrical space formed by clutch D. The disk packs D_l, E_l of clutches D, E are arranged approximately radially one above the other. The external disk carriers D_a, E_a of clutches D, E are both assigned kinematically to shaft 7 of the transmission and correspondingly connected to one another and to the ring gear of the planetary gearset RS4. In a practical manner, both external disk carriers D_a, E_a are connected to one another in their hub area and mounted radially twistable on the input shaft AN and/or shaft 1 of the transmission. The inner disk carrier D_i of clutch D is kinematically assigned to shaft 8 of the transmission and correspondingly connected to the sun gear of the planetary gearset RS2. The inner disk carrier E_i of clutch E is kinematically assigned to shaft 5 and correspondingly connected to the sun gear of the planetary gearset RS2 and the ring gear of the planetary gearset RS2. In a practical manner, the inner disk carrier E_i is mounted radially in its hub area on the input shaft AN and/or on the shaft 1 of the transmission and the inner disk carrier D_i in its hub area on the hub of the inner disk carrier E_i and/or radially twistable on shaft 8 of the transmission. Geometrically, the external disk carrier D_a of the radially outer clutch D of the group of components is configured as a cylinder-shaped pot open in the direction of the planetary gearset RS2, inside which pot the disk pack D_l and the servo D_s of clutch D, assigned to this disk pack D_l, are arranged. This servo D_s, which rotates permanently at the rotational speed of shaft 7 and is mounted axially shiftable on the external disk carrier D_a, is arranged closer to the planetary gearset RS4 than the disk pack D_l assigned to it, and actuates the pack when engaging clutch D axially in the direction of the planetary gearset RS2. The external disk carrier E_a of the radially inner clutch E of the group of components is likewise geometrically configured as a cylinder-shaped pot open in the direction of the planetary gearset RS2. The disk pack E_l and the servo E_s of clutch E, which is assigned to this disk pack E_l, are arranged inside the cylindrical space formed by this external disk carrier E_a. This servo E_s, which permanently rotates at the rotational speed of shaft 7 and is mounted axially shiftable on the external disk carrier E_a, is arranged closer to the planetary gearset RS4 than the disk pack E_l assigned to it and actuates the disk pack when engaging clutch E axially in the direction of the planetary gearset RS2. The servo D_s and the inner disk carrier D_i of (radially outer) clutch D thus enclose the external and inner disk carriers E_a, E_i of (radially inner) clutch E. The pressure medium feeds to clutch C can be realized comparatively in a simple manner, via corresponding bores and/or channels in the input shaft AN and shaft 7.

Figure 6D:
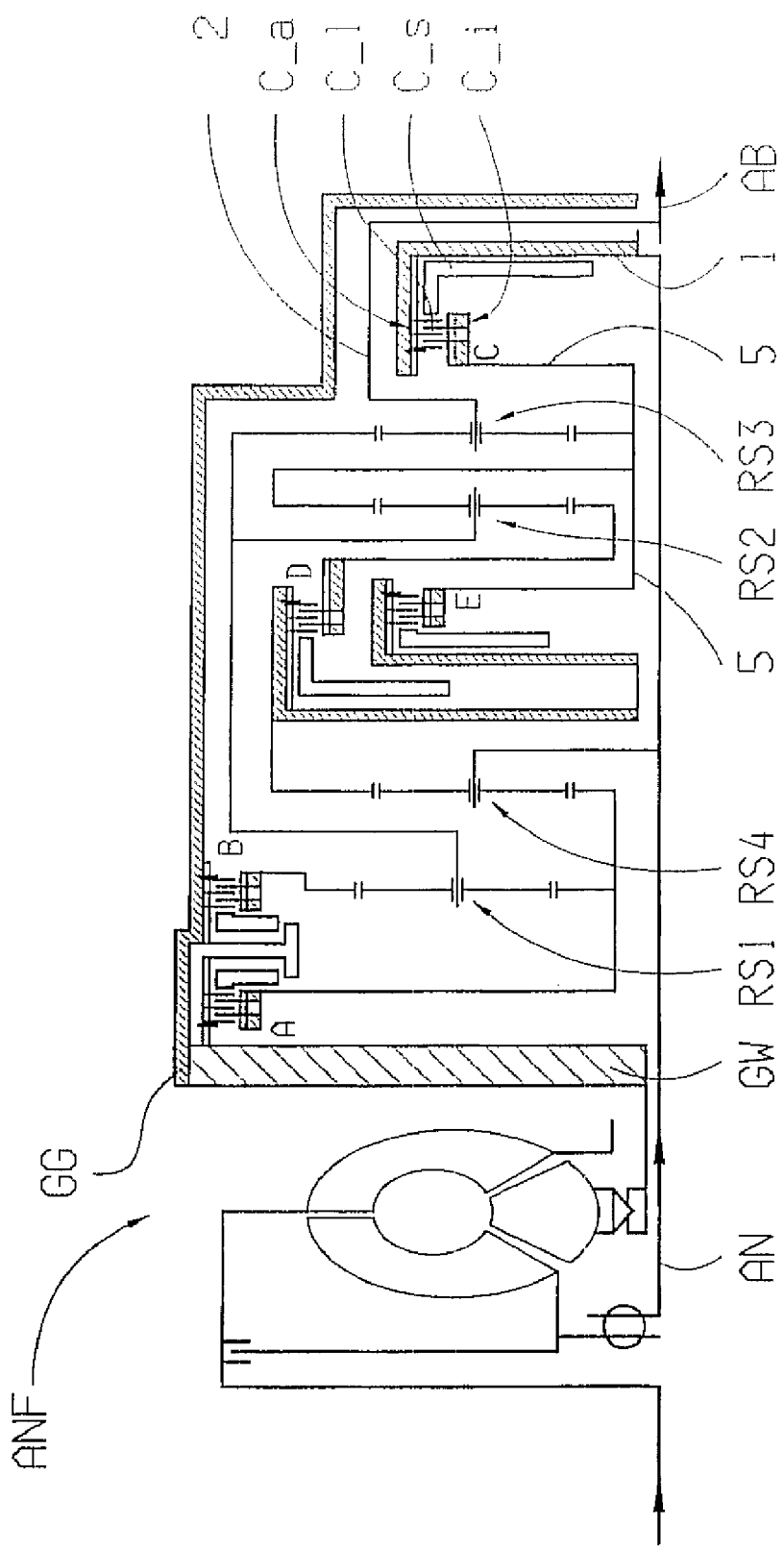
FIG. 6D is a third exemplary component layout variant for the multi-step transmission according to FIG. 6.

Finally, FIG. 6D shows the third exemplary component layout variation for the multi-speed transmission according to FIG. 6. It can easily be seen from FIG. 5D that the spatial arrangement and constructive embodiment of the gearshifting elements A, B, D and E are taken from FIG. 6C so that a description may be dispensed with at this point. The difference compared to FIG. 6C consists of the spatial arrangement and constructive embodiment of clutch C.

Viewed spatially, according to FIG. 6D, clutch C is hereafter arranged on the side of the third planetary gearset RS3 opposite the second planetary gearset RS2. According to the exemplary co-axial arrangement of the input and output shaft AN, AB of the transmission, clutch C is hereafter arranged in the area of the outer wall of the transmission housing GG near the transmission output drive. Shaft 2 of the transmission completely encompasses clutch C radially in the axial direction. The inner disk carrier C_i of clutch C is hereafter kinematically assigned to shaft 5 of the transmission and the external disk carrier C_a of clutch C is kinematically assigned to shaft 1 of the transmission. Geometrically, the external disk carrier C_a of clutch C is configured as a cylindrical pot open in the direction of the planetary gearset RS3, inside which the disk pack C_l and the servo C_s of clutch C assigned to this disk pack C_l are accommodated. The disk pack C_l is thus arranged adjacent to the planetary gearset RS3. The servo C_s, which is mounted axially shiftable on the external disk carrier C_a thus correspondingly rotates permanently at the rotational speed of the input shaft AN and/or shaft 1, and actuates the disk pack C_l assigned to it when engaging clutch C axially in the direction of the planetary gearset RS3. It will readily be apparent to the person skilled in the art that the supply of pressure medium and lubricant to clutch C may be realized in a relatively simple manner, via corresponding bores and/or channels on the input shaft AN and only one rotating pressure medium and lubricant feed.

Figure 7:
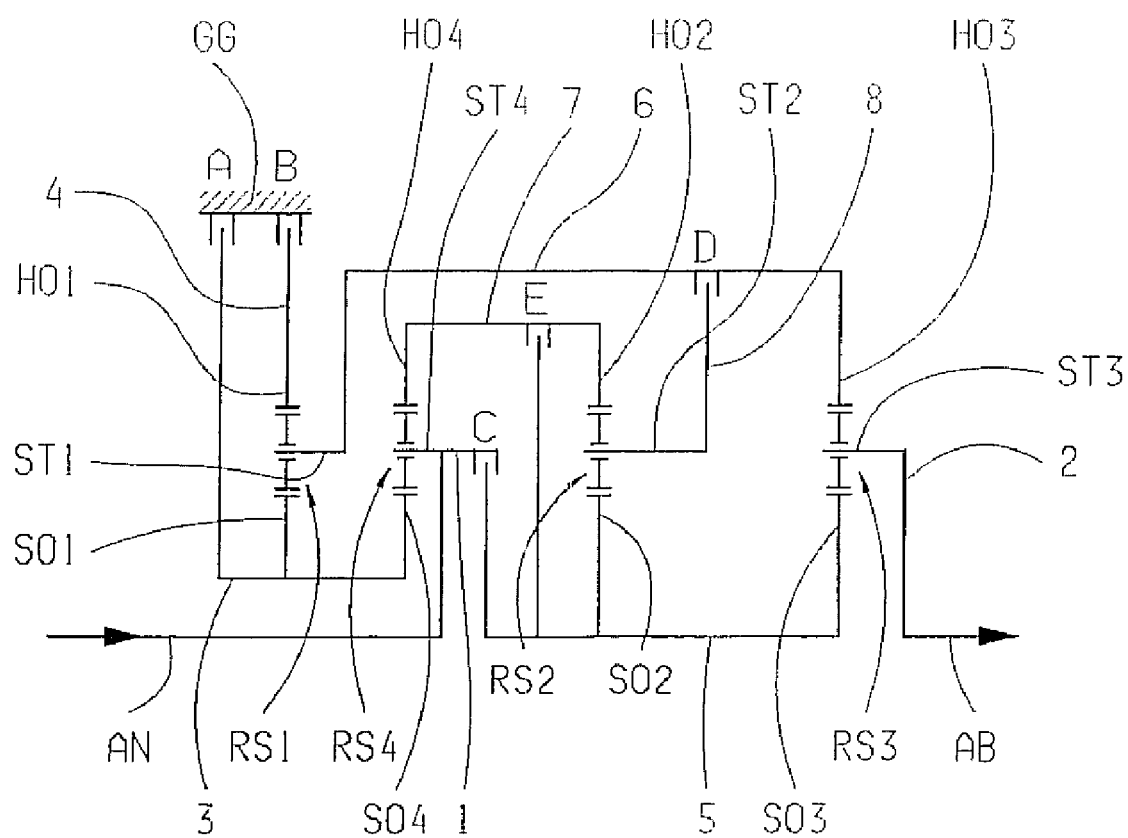
FIG. 7 is a schematic presentation of an exemplary embodiment of a multi-step transmission in line with the seventh solution according to the present invention.

Finally, FIG. 7 shows an exemplary embodiment of a multi-speed transmission in line with the seventh solution according to the present invention, again in schematic representation. Similar to FIG. 1, the transmission features the input shaft AN and the output shaft AB, four planetary gearsets RS1, RS2, RS3, RS4 and five gearshifting elements A, B, C, D, E arranged in the housing GG of the transmission, as well as a total of at least rotatable shafts 1, 2, 3, 4, 5, 6, 7, 8. All four planetary gearsets RS1, RS2, RS3, RS4 are configured as simple minus-planetary gearsets and, in this exemplary embodiment, are arranged consecutively co-axially in the sequence "RS1, RS4, RS2, RS3". The gearshifting elements A and B are configured as brakes, executed as frictionally engaged shiftable multi-disk brakes. The gearshifting elements C, D and E are configured as clutches, executed as frictionally engaged shiftable multi-disk clutches. With these five gearshifting elements A to E, selective shifting of eight forward gears and at least one reverse gear can be realized.

With respect to the kinematic coupling of the individual elements of the four planetary gearsets Rs1, RS2, RS3, RS4 to one another and to the input and output shaft AN, AB, the following is provided in the multi-speed transmission according to FIG. 7: the carrier ST4 of the fourth planetary gearset RS4 and the input shaft AN are permanently connected to one another and form the first shaft 1 of the transmission. The carrier ST3 of the third planetary gearset RS3 forms the second shaft 2 of the transmission. The sun gear SO1 of the first planetary gearset RS1 and the sun gear SO4 of the fourth planetary gearset RS4 are permanently connected to one another and form the third shaft 3 of the transmission. The ring gear HO1 of the first planetary gearset RS1 forms the fourth shaft 4 of the transmission. The sun gear SO2 of the second planetary gearset RS2 and the sun gear SO3 of the third planetary gearset RS3 are permanently connected to one another and form the fifth shaft 5 of the transmission. The carrier ST1 of the first planetary gearset RS1 and the ring gear HO3 of the third planetary gearset RS3 are permanently connected to one another and form the sixth shaft 6 of the transmission. The ring gear HO2 of the second planetary gearset RS2 and the ring gear HO4 of the fourth planetary gearset RS4 are permanently connected to one another and form the seventh shaft 7 of the transmission. Finally, the carrier ST2 of the second planetary gearset RS2 forms the eighth shaft 8 of the transmission.

With respect to the kinematic coupling of the five gearshifting elements A to E to shafts 1 to 8 of the transmission, the following is provided in the multi-speed transmission according to FIG. 7: brake A is arranged in the force flow path between the third shaft 3 and the transmission housing GG; brake B in the force flow path between the fourth shaft 4 and the transmission housing GG; clutch C in the force flow path between the first and fifth shaft 1, 5; clutch D in the force flow path between the sixth and eighth shaft 6,8, and clutch E in the force flow path between the fifth and seventh shaft 5, 7.

The difference between the gearset pattern of the generic patent application DE 10 2005 002 337.1 and FIGS. 1 to 7 is thus found in the kinematic coupling of the second planetary gearset RS2 to the other three planetary gearsets RS1, RS3, RS4 of the transmission.

In principle, the spatial arrangement of the gearshifting elements of the exemplary embodiment of the multi-speed transmission, according to the present invention, is arbitrary and restricted only by the dimensions and external shape of the transmission housing GG. The spatial arrangement of the two brakes A, B in FIG. 7 was thus taken from FIG. 1. Correspondingly, the related statements made within the scope of the description of FIG. 1 are applicable to FIG. 7 as well. The exemplary spatial location of the two clutches C, E was taken from FIG. 5, unlike in FIG. 5, clutch D is hereafter arranged axially between the two planetary gearsets RS2 and RS3. Correspondingly, the related statements made within the scope of the description of FIG. 5 and FIG. 5C are applicable to FIG. 7 as well, obviously bearing in mind the different connection of clutch D to the second planetary gearset RS2. Another constructively meaningful variation of the layout of the gearshifting elements will be described in detail below.

According to the spatial arrangement of the four planetary gearsets viewed in the axial direction in the sequence "RS1, RS4, RS2, RS3" in connection with the spatial arrangement of the five gearshifting elements A to E shown in FIG. 7, the first shaft of the transmission runs in sections centrically inside the third shaft 3. Therefore only the first shaft 1 and/or the input shaft AN runs centrically in the axial direction through the first and fourth planetary gearsets RS1, RS4. A section of the fifth shaft 5 forms the sun shaft of the second and third planetary gearset RS2, RS3, which are not passed centrically in the axial direction by any shaft of the transmission. The seventh shaft 7 completely overlaps clutch C along its axial course and forms a cylindrical space configured in sections as an external disk carrier, clutch E being arranged inside this space. Clutch C is arranged at least, to a large extent, inside a cylindrical space is formed by a section of shaft 1 configured as an external disk carrier for clutch C. The sixth shaft 6 features a section configured as an external disk carrier for clutch D and, along its axial course, completely overlaps the fourth planetary gearset RS4, the shaft 71 the secondary planetary gearset RS2 and clutch D, and thus also clutch C. Hence, clutch C is also arranged inside a cylindrical space formed by shaft 7 and also inside a cylindrical space formed by shaft 6. In addition, clutch E is also arranged inside a cylindrical space formed by shaft 6.

FIG. 7A shows a shift pattern of the multi-speed transmission, according to the present invention shown in FIG. 7. In each gear, three gearshifting elements are engaged and two gearshifting elements are disengaged, wherein the gearshift logic is identical to FIG. 1A. Besides this gearshift logic, exemplary values for the transmission ratios i of the individual gear steps as well as the step jumps φ that can be derived from them can be seen from the shift pattern. The specified transmission ratios i are derived from the (typical) stationary gear ratios of the four planetary gearsets RS1, RS2, RS3, RS4 of minus 2.12, minus 1.55, minus 3.70 and minus 2.07.

Figure 7B:
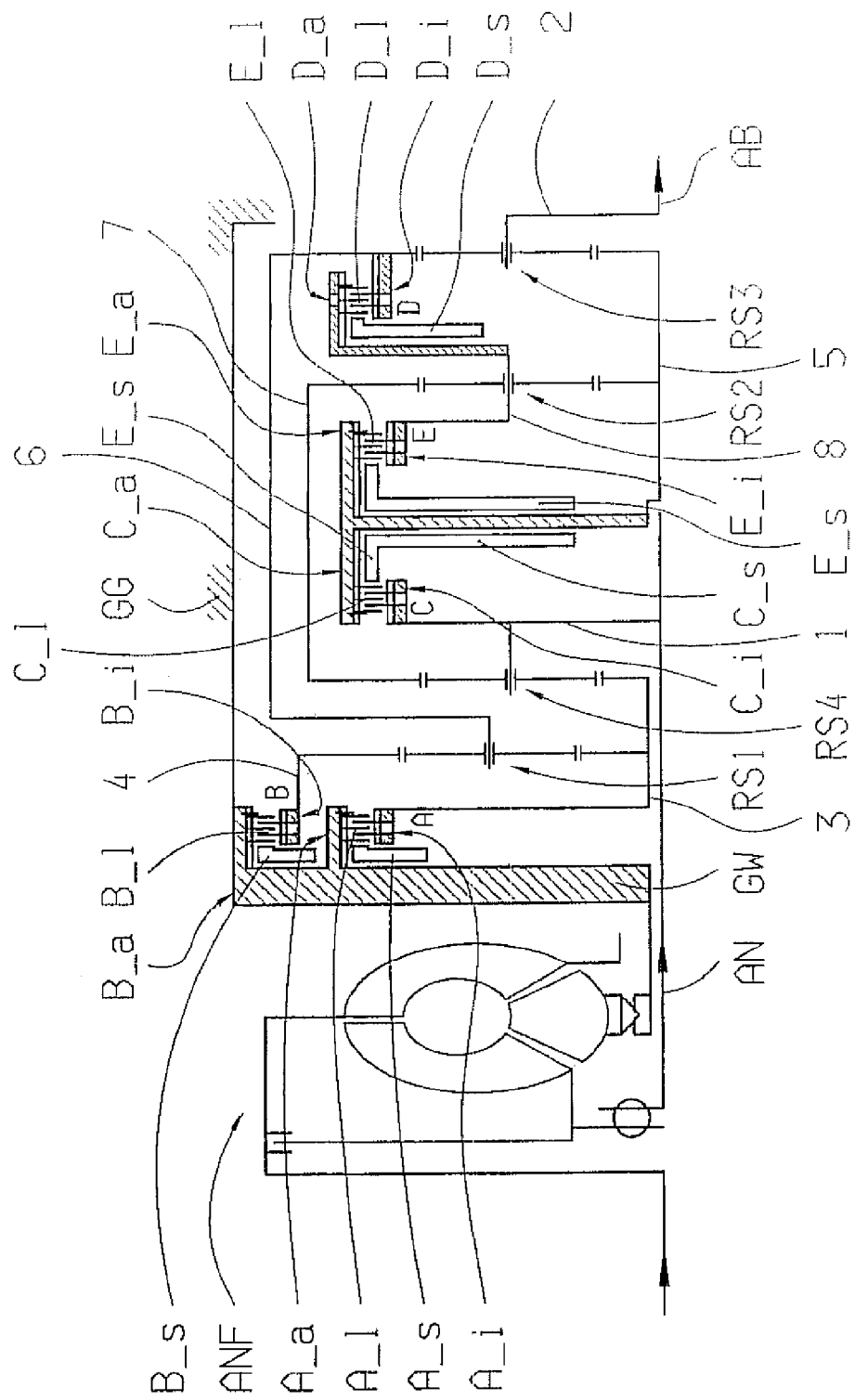
FIG. 7B is an exemplary component layout variant for the multi-step transmission according to FIG. 7.
Figure 8:
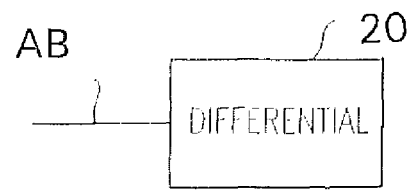
FIG. 8 is a diagrammatic view of an embodiment of the inventive multiple gear transmission.
Figure 9:
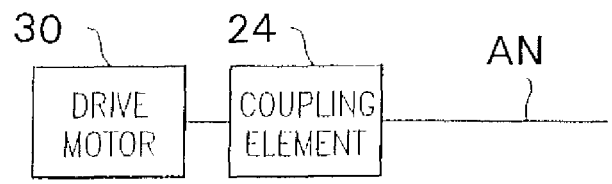
FIG. 9 is a diagrammatic view of an embodiment of the inventive multiple gear transmission.
Figure 10:
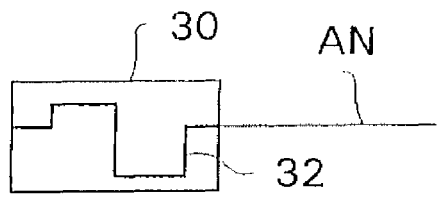
FIG. 10 is a diagrammatic view of an embodiment of the inventive multiple gear transmission.
Figure 11:
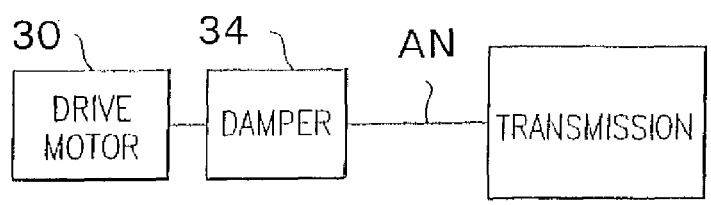
FIG. 11 is a diagrammatic view of an embodiment of the inventive multiple gear transmission.
Figure 12:
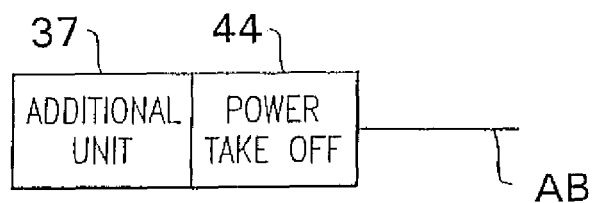
FIG. 12 is a diagrammatic view of an embodiment of the inventive multiple gear transmission.
Figure 13:
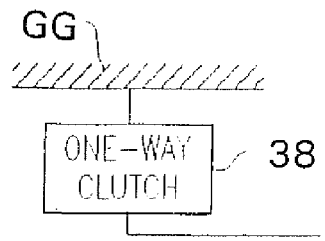
FIG. 13 is a diagrammatic view of a preferred design of the inventive multiple gear transmission.
Figure 14:
FIG. 14 is a diagrammatic view of a preferred design of the inventive multiple gear transmission.
Figure 15:
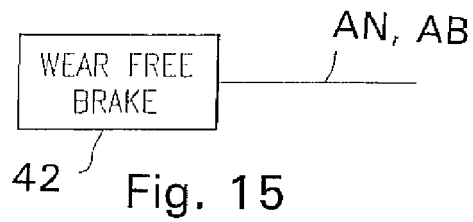
FIG. 15 is a diagrammatic view of a preferred design of the inventive multiple gear transmission.
Figure 16:
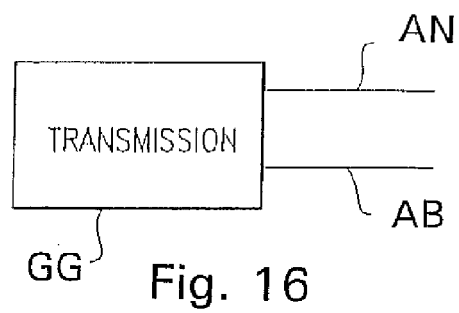
FIG. 16 is a diagrammatic view of a preferred design of the inventive multiple gear transmission.
Figure 17:
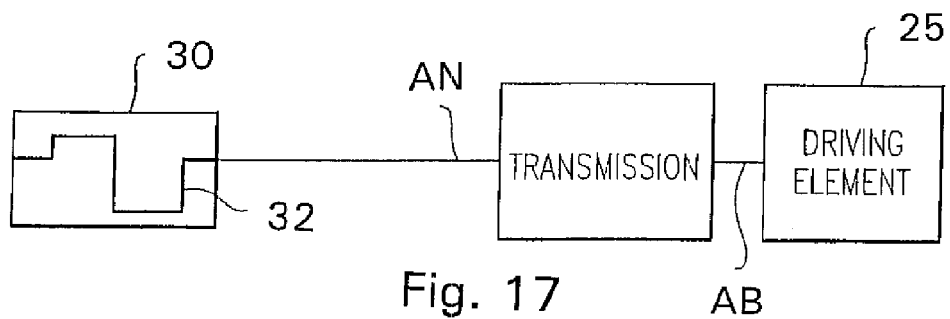
FIG. 17 is a diagrammatic view of a preferred design of the inventive multiple gear transmission.

FIG. 7B hereafter shows an exemplary, constructively meaningful component layout variation of the multi-speed transmission according to FIG. 7. The spatial arrangement and constructive embodiment of the two brakes A, B is taken from FIG. 5B so that a description may be dispensed with at this point. It can easily seen from FIG. 7B that the differences with respect to FIG. 7 concern only the constructive embodiment of clutches C, D and E. Similar to FIG. 7, viewed spatially, clutches C and E are arranged axially between the fourth planetary gearset RS4 and the second planetary gearset RS2, the clutch D axially between the second planetary gearset RS2 and the third planetary gearset RS3.

As a constructive detail, it is provided in FIG. 7B that the two clutches C and E form a pre-assembled group of components. For this purpose, a common external disk carrier C_a/E_a is provided for the two clutches C, E, which is kinematically assigned to shaft 5 of the transmission and, according to the basic shift pattern, connected to the sun gears of the second and third planetary gearset RS2, RS3. Geometrically, this common external disk carrier C_a/E_a is configured as a cylinder-shaped pot open at both ends, with a pot bottom arranged approximately in the center. Clutch C is arranged on the side of this pot bottom facing the planetary gearset RS4 and clutch E on the side of this pot bottom facing the planetary gearset RS2, in each case inside a cylindrical space formed by the external disk carriers C_a/E_a. The servos C_S, E_s of the two clutches C, E are respectively adjacent to the pot bottom and are both mounted axially shiftable on the common external disk carrier C_a/E_a so that the servo C_s activates the disk pack C_l assigned to it when engaging clutch C axially in the direction of the planetary gearset RS4 and the servo E_s actuates the disk pack E_l assigned to it when engaging clutch E axially in the direction of the planetary gearset RS2. Both servos C_s, E_s thus rotate permanently at the rotational speed of (sun) shaft 5. The inner disk carrier C_i of clutch C is kinematically assigned to shaft 1 of the transmission and correspondingly connected to the carrier of the planetary gearset RS4 and the input shaft AN. The inner disk carrier E_i of clutch E is kinematically assigned to shaft 8 of the transmission and correspondingly connected to the carrier of the planetary gearset RS2. It will easily be apparent to the person skilled in the art that pressure medium and lubricant may be fed to the two clutches C, E in a comparatively simple manner, either from the input shaft AN or from the output shaft AB.

As a further constructive detail, it is provided in FIG. 7B that the external disk carrier D_a of clutch D is kinematically assigned to shaft 5 and, according to the basic shift pattern, connected to the carrier of the second planetary gearset RS2 and that the inner disk carrier D_i of clutch D is kinematically assigned to shaft 6 of the transmission and correspondingly connected to the ring gear of the third planetary gearset RS3 and the carrier of the first planetary gearset RS1. Geometrically, the external disk carrier D_a is thus configured as a cylinder-shaped pot open in the direction of the planetary gearset RS3, inside which the disk pack D_l and the servo D_S of clutch D assigned to this disk pack D_l are arranged. The disk pack D_l is thus arranged immediately adjacent to the planetary gearset RS3. The exterior disk carrier D_a and the carrier plate of the planetary gearset RS2 facing the planetary gearset RS3 may be configured as one piece and mounted radially twistable on (sun) shaft 8. The servo D_s, which rotates permanently at the rotational speed of shaft 6 and is mounted axially shiftable on the external disk carrier D_a actuates the assigned disk pack D_i when engaging clutch D axially in the direction of the planetary gearset RS3. It will be easily apparent to the person skilled in the art that the supply of pressure medium and lubricant to clutch D may be realized in a comparatively simply manner via only two rotating pressure medium and/or lubricant feeds.

The following applies to all of the represented and/or described exemplary embodiments of the entire transmission family according to the present invention.

According to the present invention, depending on the stationary gear ratios of the individual planetary gearsets, different gear steps can be derived from the same shift pattern so that an application-specific and/or vehicle-specific variation is possible.

It is also possible to provide additional freewheeling mechanisms at any suitable position of the multi-speed transmission, for example, between a shaft and the housing or, if applicable, in order to connect two shafts.

According to the present invention, an axle differential and/or a distributor differential can also be arranged on the input side or on the output side.

Within the scope of an advantageous further development, the input shaft AN may, if required, be separated by way of a starting element from a drive motor, wherein a hydrodynamic converter, a hydraulic clutch, a dry starting clutch, a wet starting clutch, a magnetic particle clutch or a centrifugal clutch may be used as a starting element of this kind. It is also possible to arrange a starting element of this kind in the direction of the force flow path behind the transmission, in this case the input shaft AN being permanently connected to the crankshaft of the drive motor.

In addition, the multi-speed transmission, according to the present invention, makes arranging a torsional vibration damper between the drive motor and the transmission possible.

Within the scope of a further exemplary embodiment of the invention (not shown), a wear-free brake, such as a hydraulic or electric retarder or similar, may be arranged on any shaft, preferably on the input shaft AN or output shaft AB, which is particularly important in commercial vehicles. Moreover, an auxiliary drive can be provided in order to drive additional devices on any shaft, preferably on the input shaft AN or output shaft AB.

The applied gearshifting elements can be configured as power shift clutches or brakes. In particular, non-positive clutches or brakes, such as multi-disk clutches, band brakes, and/or conical brakes can be used. Furthermore, positive-locking brakes and/or clutches, such as synchronizations or claw clutches, can be used as gearshifting elements.

An additional advantage of the multi-speed transmission presented here is that an electric machine can be attached to any shaft as a generator and/or as an additional prime mover.

Any constructive embodiment, in particular any spatial arrangement of the planetary gearsets and gearshifting elements, as such or in relation to one another, to the extent they are technically expedient, falls under the scope of protection of the present claims, without influencing the function of the transmission as described in the claims, even if these embodiments are not explicitly represented in the Figures or mentioned in the description.

REFERENCE NUMERALS 1 first shaft
2 second shaft
3 third shaft
4 fourth shaft
5 fifth shaft
6 sixth shaft
7 seventh shaft
8 eighth shaft
A first gearshifting element, first brake
A_a external disk carrier of the first gearshifting element
A_i inner disk carrier of the first gearshifting element
A_l disk pack of the first gearshifting element
A_s servo of the first gearshifting element
B second gearshifting element, second brake
B_a external disk carrier of the second gearshifting element
B_i inner disk carrier of the second gearshifting element
B_l disk pack of the second gearshifting element
B_s servo of the second gearshifting element
C third gearshifting element, first clutch
C_a external disk carrier of the third gearshifting element
C_i inner disk carrier of the third gearshifting element
C_l disk pack of the third gearshifting element
C_s servo of the third gearshifting element
D fourth gearshifting element, second clutch
D_a external disk carrier of the fourth gearshifting element
D_i inner disk carrier of the fourth gearshifting element
D_l disk pack of the fourth gearshifting element
D_s servo of the fourth gearshifting element
E fifth gearshifting element, third brake
E_a external disk carrier of the fifth gearshifting element
E_i inner disk carrier of the fifth gearshifting element
E_l disk pack of the fifth gearshifting element
E_s servo of the fifth gearshifting element
AB output shaft
AN input shaft
GG housing
GN hub attached to the housing
GW housing wall
PU oil pump
ANF starting element, torque converter
NAB rotational speed sensor
NAN rotational speed sensor
RS1 first planetary gearset
HO1 ring gear of the first planetary gearset
SO1 sun gear of the first planetary gearset
ST1 carrier of the first planetary gearset
PL1 planetary gears of the first planetary gearset
RS2 second planetary gearset
HO2 ring gear of the second planetary gearset
SO2 sun gear of the second planetary gearset
ST2 carrier of the second planetary gearset
PL2 planetary gears of the second planetary gearset
RS3 third planetary gearset
HO3 ring gear of the third planetary gearset
SO3 sun gear of the third planetary gearset
ST3 carrier of the third planetary gearset
PL3 planetary gears of the third planetary gearset
RS4 fourth planetary gearset
HO4 ring gear of the fourth planetary gearset
SO4 sun gear of the fourth planetary gearset
ST4 carrier of the fourth planetary gearset
PL4 planetary gears of the fourth planetary gearset
i transmission ratio
φ jump steps

The invention claimed is:

1. A multi-speed automatic transmission of a planetary design for a motor vehicle, the transmission comprising:
   an input shaft (AN) and an output shaft (AB);
   first, second, third and fourth planetary gear sets (RS1, RS2, RS3, RS4), and each of the first planetary gear set (RS1), the second planetary gear set (RS2), the third planetary gear set (RS3) and the fourth planetary gear set (RS4) comprising a sun gear, a carrier and a ring gear;
   at least first, second, third, fourth, fifth, sixth, seventh and eighth rotatable shafts (1, 2, 3, 4, 5, 6, 7, 8),
   first, second, third, fourth and fifth gearshifting elements (A, B, C, D, E) whose selective engagement creates different gear ratios between the input shaft (AN) and the output shaft (AB) so that eight forward gears and at least one reverse gear can be implemented;

wherein the first gearshifting element (A) is located in a force flow path between the third shaft (3) and a housing (GG) of the transmission;

the second gearshifting element (B) is located in a force flow path between the fourth shaft (4) and the housing (GG) of the transmission;

the third gearshifting element (C) is located in a force flow path between the first shaft (1) and the fifth shaft (5);

the fourth gearshifting element (D) is located in a force flow path between the second shaft (2) and the eighth shaft (8);

the fifth gearshifting element (E) is located in a force flow path between the fifth shaft (5) and the seventh shaft (7);

the carrier (ST4) of the fourth planetary gearset (RS4) and the input shaft (AN) are coupled to one another and form the first shaft (1);

the carrier (ST3) of the third planetary gearset (RS3) and the output shaft (AB) are coupled to one another and form the second shaft (2);

the sun gear (SO1) of the first planetary gearset (RS1) and the sun gear (SO4) of the fourth planetary gearset (RS4) are coupled to one another and form the third shaft (3);

the ring gear (HO1) of the first planetary gearset (RS1) forms the fourth shaft (4);

the sun gear (SO3) of the third planetary gearset (RS3) forms the fifth shaft (5);

the carrier (ST1) of the first planetary gearset (RS1) and the carrier (ST2) of the second planetary gearset (RS2) and the ring gear (HO3) of the third planetary gearset (RS3) are coupled to one another and form the sixth shaft (6);

the sun gear (SO2) of the second planetary gearset (RS2) and the ring gear (HO4) of the fourth planetary gearset (RS4) are coupled to one another and form the seventh shaft (7); and the ring gear (HO2) of the second planetary gearset (RS2) forms the eighth shaft (8).

2. The multi-speed transmission according to claim 1, wherein
a first forward gear is implemented by engagement of the first gearshifting element (A), the second gearshifting element (B) and the third gearshifting element (C);
a second forward gear is implemented by engagement of the first gearshifting element (A), the second gearshifting element (B) and the fifth gearshifting element (E);
a third forward gear is implemented by engagement of the second gearshifting element (B), the third gearshifting element (C) and the fifth gearshifting element (E);
a fourth forward gear is implemented by engagement of the second gearshifting element (B), the fourth gearshifting element (D) and the fifth gearshifting element (E);
a fifth forward gear is implemented by engagement of the second gearshifting element (B), the third gearshifting element (C) and the fourth gearshifting element (D);
a sixth forward gear is implemented by engagement of the third gearshifting element (C), the fourth gearshifting element (D) and the fifth gearshifting element (E);
a seventh forward gear is implemented by engagement of the first gearshifting element (A), the third gearshifting element (C) and the fourth gearshifting element (D);
an eighth forward gear is implemented by engagement of the first gearshifting element (A), the fourth gearshifting element (D) and the fifth gearshifting element (E); and
a reverse gear is implemented by engagement of the first gearshifting element (A), the second gearshifting element (B) and the fourth gearshifting element (D).

3. The multi-speed transmission according to claim 1, wherein one of the first gearshifting element (A) and the second gearshifting element (B) initiates motor vehicle drive in one of a forward direction and a reverse direction, and the input shaft (AN) is connected to a crankshaft of a drive motor.

4. The multi-speed transmission according to claim 1 wherein, the fourth gearshifting element (D), when viewed spatially, is axially located between the second planetary gearset (RS2) and the third planetary gearset (RS3).

5. The multi-speed transmission according to claim 1 wherein, the fourth gearshifting element (D), when viewed spatially, is axially located substantially between the fourth planetary gearset (RS4) and the second planetary gearset (RS2).

6. The multi-speed transmission according to claim 1 wherein, the fourth gearshifting element (D), when viewed spatially, is axially located between the first planetary gearset (RS1) and the fourth planetary gearset (RS4).

7. The multi-speed transmission according to claim 1 wherein, the fourth gearshifting element (D), when viewed spatially, is radially located at least partially above one of the second planetary gearset (RS2) and the fourth planetary gearset (RS4).

8. The multi-speed transmission according to claim 1 wherein, the fifth gearshifting element (E), when viewed spatially, is axially located between the second planetary gearset (RS2) and the third planetary gearset (RS3).

9. The multi-speed transmission according to claim 1, wherein the fifth gearshifting element (E) is axially located between the second planetary gearset (RS2) and the fourth planetary gearset (RS4).

10. The multi-speed transmission according to claim 1, wherein each of the first planetary gear set (RS1), the second planetary gear set (RS2), the third planetary gear set (RS3) and the fourth planetary gear set (RS4) is a negative-planetary gearset.

11. The multi-speed transmission according to claim 1, wherein the first planetary gear set (RS1), the second planetary gear set (RS2), the third planetary gear set (RS3) and the fourth planetary gear set (RS4) are co-axially arranged in a sequential order of:
the first planetary gear set (RS1), the fourth planetary gear set (RS4), the second planetary gear set (RS2) and the third planetary gear set (RS3).

12. The multi-speed transmission according to claim 1, wherein, at most, one of the input shaft (AN), the output shaft (AB), the first shaft (1), the second shaft (2), the third shaft (3), the fourth shaft (4), the fifth shaft (5), the sixth shaft (6), the seventh shaft (7), and the eighth shaft (8) axially, centrally passes through each of the first planetary gear set (RS1), the second planetary gearset (RS2), the third planetary gear set (RS3) and the fourth planetary gearset (RS4).

13. The multi-speed transmission according to claim 1, wherein none of the input shaft (AN), the output shaft (AB), the first shaft (1), the second shaft (2), the third shaft (3), the fourth shaft (4), the fifth shaft (5), the sixth shaft (6), seventh shaft (7), and the eighth shaft (8) axially, centrally pass through at least one of the second planetary gearset (RS2) and the third planetary gearset (RS3).

14. The multi-speed transmission according to claim 1, wherein the first planetary gearset (RS1) and the fourth planetary gearset (RS4) are only axially, centrally passed through by at least one of the input shaft (AN) and the first shaft (1), and both the seventh shaft (7) and at least one of the input shaft (AN) and the first shaft (1) axially, centrally pass through the second planetary gearset (RS2).

15. The multi-speed transmission according to claim 1, wherein the third shaft (3) is rotationally supported on a hub (GN) fixed to the housing.

16. The multi-speed transmission according to claim 1 wherein at least one of the first gearshifting element (A) and the second gearshifting element (B), when viewed spatially, is radially arranged at least partially above at least one of the first planetary gearset (RS1) and the fourth planetary gearset (R54).

17. The multi-speed transmission according to claim 1 wherein the first gearshifting element (A) is immediately axially adjacent to the second gearshifting element (B).

18. The multi-speed transmission according to claim 1 wherein, the second gearshifting element (B), when viewed spatially, is at least substantially radially above the first gearshifting element (A).

19. The multi-speed transmission according to claim 1 wherein, the first gearshifting element (A), when viewed spatially, is at least partially located on a side of the first planetary gearset (RS1) opposite from the fourth planetary gearset (RS4).

20. The multi-speed transmission according to claim 1 wherein, the third gearshifting element (C), when viewed spatially, is essentially located on a side of the third planetary gearset (RS3) opposite from the second planetary gearset (RS2).

21. The multi-speed transmission according to claim 1 wherein, the third gearshifting element (C), when viewed spatially, is axially located essentially between the second planetary gearset (RS2) and the third planetary gearset (RS3).

22. The multi-speed transmission according to claim 21 wherein, viewed spatially, the third gearshifting element (C) is arranged axially in an area between the fifth and the fourth gearshifting element (E, D).

23. The multi-speed transmission according to claim 21 wherein, the third gearshifting element (C), when viewed spatially, is radially located at least partially below a disk set of one of the fourth gearshifting element (D) and the fifth gearshifting element (E).

24. The multi-speed transmission according to claim 1 wherein, the third gearshifting element (C), when viewed spatially, is axially located between the fourth planetary gearset (RS4) and the second planetary gearset (RS2).

25. A multi-speed automatic transmission of a planetary design for a motor vehicle, the transmission comprising:
an input shaft (AN) and an output shaft (AB);
first, second, third and fourth planetary gear sets (RS1, RS2, RS3, RS4), and each of the first planetary gear set (RS1), the second planetary gear set (RS2), the third planetary gear set (RS3) and the fourth planetary gear set (RS4) comprising a sun gear, a carrier and a ring gear;
at least first, second, third, fourth, fifth, sixth, seventh and eighth rotatable shafts (1,2,3,4,5,6,7,8),
first, second, third, fourth and fifth gearshifting elements (A, B, C, D, E) whose selective engagement creates different gear ratios between the input shaft (AN) and the output shaft (AB) so that eight forward gears and at least one reverse gear can be implemented;
wherein the first gearshifting element (A) is located in a force flow path between the third shaft (3) and a housing (GG) of the transmission;
the second gearshifting element (B) is located in a force flow path between the fourth shaft (4) and the housing (GG) of the transmission;
the third gearshifting element (C) is located in a force flow path between the first shaft (1) and the fifth shaft (5);
the fourth gearshifting element (D) is located in a force flow path between the seventh shaft (7) and the eighth shaft (8);
the fifth gearshifting element (E) is located in a force flow path between the fifth shaft (5) and the seventh shaft (7);
the carrier (ST4) of the fourth planetary gearset (RS4) and the input shaft (AN) are coupled to one another and fan the first shaft (1);
the carrier (ST2) of the second planetary gearset (RS2) and the carrier (ST3) of the third planetary gearset (RS3) and the output shaft (AB) are coupled to one another and form the second shaft (2);
the sun gear (SO1) of the first planetary gearset (RS1) and the sun gear (SO4) of the fourth planetary gearset (RS4) are coupled to one another and form the third shaft (3);
the ring gear (HO1) of the first planetary gearset (RS1) forms the fourth shaft (4);
the ring gear (HO2) of the second planetary gearset (RS2) and the sun gear (SO3) of the third planetary gearset (RS3) are coupled to one another and form the fifth shaft (5);
the carrier (ST1) of the first planetary gearset (RS1) and the ring gear (HO3) of the third planetary gearset (RS3) are coupled to one another and form the sixth shaft (8);
the ring gear (HO4) of the fourth planetary gearset (RS4) forms the seventh shaft (7), and
the sun gear (SO2) of the second planetary gearset (RS2) forms the eighth shaft (8).

26. A multi-speed automatic transmission of a planetary design for a motor vehicle, the transmission comprising:
an input shaft (AN) and an output shaft (AB);
first, second, third and fourth planetary gear sets (RS1, RS2, RS3, RS4), and each of the first planetary gear set (RS1), the second planetary gear set (RS2), the third planetary gear set (RS3) and the fourth planetary gear set (RS4) comprising a sun gear, a carrier and a ring gear;
at least first, second, third, fourth, fifth, sixth, seventh and eighth rotatable shafts (1, 2, 3, 4, 5, 6, 7, 8),
first, second, third, fourth and fifth gearshifting elements (A, B, C, D, E) whose selective engagement creates different gear ratios between the input shaft (AN) and the output shaft (AB) so that eight forward gears and at least one reverse gear can be implemented;
wherein the first gearshifting element (A) is located in a force flow path between the third shaft (3) and a housing (GG) of the transmission;
the second gearshifting element (B) is located in a force flow path between the fourth shaft (4) and the housing (GG) of the transmission;
the third gearshifting element (C) is located in a force flow path between the first shaft (1) and the fifth shaft (5);
the fourth gearshifting element (D) is located in a force flow path between the sixth shaft (6) and the eighth shaft (8);
the fifth gearshifting element (E) is located in a force flow path between the fifth shaft (5) and the seventh shaft (7);
the carrier (ST4) of the fourth planetary gearset (RS4) and the input shaft (AN) are coupled to one another and form the first shaft (1);
the ring gear (HO2) of the second planetary gearset (RS2) and the carrier (ST3) of the third planetary gearset (RS3) and the output shaft (AB) are coupled to one another and form the second shaft (2);
the sun gear (SO1) of the first planetary gearset (RS1) and the sun gear (SO4) of the fourth planetary gearset (RS4) are coupled to one another and form the third shaft (3);
the ring gear (HO1) of the first planetary gearset (RS1) forms the fourth shaft (4);
the sun gear (SO3) of the third planetary gearset (RS3) forms the fifth shaft (5);

the carrier (ST1) of the first planetary gearset (RS1) and the ring gear (HO3) of the third planetary gearset (RS3) are coupled to one another and form the sixth shaft (6);

the sun gear (SO2) of the second planetary gearset (RS2) and the ring gear (HO4) of the fourth planetary gearset (RS4) are coupled to one another and form the seventh shaft (7); and the carrier (ST2) of the second planetary gearset (RS2) forms the eighth shaft (8).

27. A multi-speed automatic transmission of a planetary design for a motor vehicle, the transmission comprising:

an input shaft (AN) and an output shaft (AB);

first, second, third and fourth planetary gear sets (RS1, RS2, RS3, RS4), and each of the first planetary gear set (RS1), the second planetary gear set (RS2), the third planetary gear set (RS3) and the fourth planetary gear set (RS4) comprising a sun gear, a carrier and a ring gear;

at least first, second, third, fourth, fifth, sixth, seventh and eighth rotatable shafts (1, 2, 3, 4, 5, 6, 7, 8), first, second, third, fourth and fifth gearshifting elements (A, B, C, D, E) whose selective engagement creates different gear ratios between the input shaft (AN) and the output shaft (AB) so that eight forward gears and at least one reverse gear can be implemented;

wherein the first gearshifting element (A) is located in a force flow path between the third shaft (3) and a housing (GG) of the transmission;

the second gearshifting element (B) is located in a force flow path between the fourth shaft (4) and the housing (GG) of the transmission;

the third gearshifting element (C) is located in a force flow path between the first shaft (1) and the fifth shaft (5);

the fourth gearshifting element (D) is located in a force flow path between the seventh shaft (7) and the eighth shaft (8);

the fifth gearshifting element (E) is located in a force flow path between the fifth shaft (5) and the seventh shaft (7);

the carrier (ST4) of the fourth planetary gearset (RS4) and the input shaft (AN) are coupled to one another and form the first shaft (1);

the ring gear (HO2) of the second planetary gearset (RS2) and the carrier (ST3) of the third planetary gearset (RS3) and the output shaft (AB) are coupled to one another and form the second shaft (2);

the sun gear (SO1) of the first planetary gearset (RS1) and the sun gear (SO4) of the fourth planetary gearset (RS4) are coupled to one another and form the third shaft (3);

the ring gear (HO1) of the first planetary gearset (RS1) forms the fourth shaft (4);

the sun gear (SO3) of the third planetary gearset (RS3) forms the fifth shaft (5);

the carrier (ST1) of the first planetary gearset (RS1) and the carrier (ST2) of the second planetary gearset (RS2) and the ring gear (HO3) of the third planetary gearset (RS3) are coupled to one another and form the sixth shaft (6);

the ring gear (HO4) of the fourth planetary gearset (RS4) forms the seventh shaft (7); and the sun gear (SO2) of the second planetary gearset (RS2) forms the eighth shaft (8).

28. A multi-speed automatic transmission of a planetary design for a motor vehicle, the transmission comprising:

an input shaft (AN) and an output shaft (AB);

first, second, third and fourth planetary gear sets (RS1, RS2, RS3, RS4), and each of the first planetary gear set (RS1), the second planetary gear set (RS2), the third planetary gear set (RS3) and the fourth planetary gear set (RS4) comprising a sun gear, a carrier and a ring gear;

at least first, second, third, fourth, fifth, sixth, seventh and eighth rotatable shafts (1, 2, 3, 4, 5, 6, 7, 8), first, second, third, fourth and fifth gearshifting elements (A, B, C, D, E) whose selective engagement creates different gear ratios between the input shaft (AN) and the output shaft (AB) so that eight forward gears and at least one reverse gear can be implemented;

wherein the first gearshifting element (A) is located in a force flow path between the third shaft (3) and a housing (GG) of the transmission;

the second gearshifting element (B) is located in a force flow path between the fourth shaft (4) and the housing (GG) of the transmission;

the third gearshifting element (C) is located in a force flow path between the first shaft (1) and the fifth shaft (5);

the fourth shifting element (D) is located in a force flow path between the fifth shaft (5) and the eighth shaft (8);

the fifth gearshifting element (E) is located in a force flow path between the fifth shaft (5) and the seventh shaft (7);

the carrier (ST4) of the fourth planetary gearset (RS4) and the input shaft (AN) are coupled to one another and form the first shaft (1);

the carrier (ST3) of the third planetary gearset (RS3) and the output shaft (AB) are coupled to one another and form the second shaft (2);

the sun gear (SO1) of the first planetary gearset (RS1) and the sun gear (SO4) of the fourth planetary gearset RS4) are coupled to one another and form the third shaft (3);

the ring gear (HO1) of the first planetary gearset (RS1) forms the fourth shaft (4);

the sun gear (SO3) of the third planetary gearset (RS3) forms the fifth shaft (5);

the carrier (ST1) of the first planetary gearset (RS1) and the carrier (ST2) of the second planetary gearset (RS2) and the ring gear (HO3) of the third planetary gearset (RS3) are coupled to one another and form the sixth shaft (6);

the ring gear (HO2) of the second planetary gearset (RS2) and the ring gear (HO4) of the fourth planetary gearset (RS4) are coupled to one another and form the seventh shaft (7); and the sun gear (SO2) of the second planetary gearset (RS2) forms the eighth shaft (8).

29. A multi-speed automatic transmission of a planetary design for a motor vehicle, the transmission comprising:

an input shaft (AN) and an output shaft (AB);

first, second, third and fourth planetary gear sets (RS1, RS2, RS3, RS4), and each of the first planetary gear set (RS1), the second planetary gear set (RS2), the third planetary gear set (RS3) and the fourth planetary gear set (RS4) comprising a sun gear, a carrier and a ring gear;

at least first, second, Third, fourth, fifth, sixth, seventh and eighth rotatable shafts (1, 2, 3, 4, 5, 6, 7, 8), first, second, third, fourth and fifth gearshifting elements (A, B, C, D, E) whose selective engagement creates different gear ratios between the input shaft (AN) and the output shaft (AB) so that eight forward gears and at least one reverse gear can be implemented;

wherein the first gearshifting element (A) is located in a force flow path between the third shaft (3) and a housing (GG) of the transmission;

the second gearshifting element (B) is located in a force flow path between the fourth shaft (4) and the housing (GG) of the transmission;

the third gearshifting element (C) is located in a force flow path between the first shaft (1) and the fifth shaft (5);

the fourth gearshifting element (D) is located in a force flow path between the seventh shaft (7) and the eighth shaft (8):

the fifth gearshifting element (E) is arranged in a force flow path between the fifth shaft (5) and the seventh shaft (7);

the carrier (ST4) of the fourth planetary gearset (RS4) and the input shaft (AN) are coupled to one another and form the first shaft (1);

the carrier (ST3) of the third planetary gearset (RS3) and the output shaft (AB) are coupled to one another and form the second shaft (2);

the sun gear (SO1) of the first planetary gearset (RS1) and the sun gear (SO4) of the fourth planetary gearset (RS4) are coupled to one another and form the third shaft (3);

the ring gear (HO1) of the first planetary gearset (RS1) forms the fourth shaft (4);

the ring gear (HO2) of the second planetary gearset (RS2) and the sun gear (SO3) of the third planetary gearset (RS3) are coupled to one another and form the fifth shaft (5);

the carrier (ST1) of the first planetary gearset (RS1) and the carrier (ST2) of the second planetary gearset (RS2) and the ring gear (HO3) of the third planetary gearset (RS3) are coupled Jo one another and form the sixth shaft (6);

the ring gear (HO4) of the fourth planetary gearset (RS4) forms the seventh shaft (7); and the sun gear (SO2) of the second planetary gearset (RS2) forms the eighth shaft (8).

30. A multi-speed automatic transmission of a planetary design for a motor vehicle, the transmission comprising:

an input shaft (AN) and an output shaft (AB);

first, second, third and fourth planetary gear sets (RS1, RS2, RS3, RS4), and each of the first planetary gear set (RS1), the second planetary gear set (RS2), the third planetary gear set (RS3) and the fourth planetary gear set (RS4) comprising a sun gear, a carrier and a ring gear;

at least first, second, third, fourth, fifth, sixth, seventh and eighth rotatable shafts (1, 2, 3, 4, 5, 6, 7, 8), first, second, third, fourth and fifth gearshifting elements (A, B, C, D, E) whose selective engagement creates different gear ratios between the input shaft (AN) and the output shaft (AB) so that eight forward gears and at least one reverse gear can be implemented;

wherein the first gearshifting element (A) is located in a force flow path between the third shaft (3) and a housing (GG) of the transmission;

the second gearshifting element (B) is located in a force flow path between the fourth shaft (4) and the housing (GG) of the transmission;

the third gearshifting element (C) is located in a force flow path between the first shaft (1) and the fifth shaft (5);

the fourth gearshifting element (D) is located in a force flow path between the sixth shaft (6) and the eighth shaft (8);

the fifth gearshifting element (E) is located in a force flow path between the fifth shaft (5) and the seventh shaft (7);

the carrier (ST4) of the fourth planetary gearset (RS4) and the input shaft (AN) are coupled to one another and form the first shaft (1);

the carrier (ST3) of the third planetary gearset (RS3) and the output shaft (AB) are coupled to one another and form the second shaft (2);

the sun gear (SO1) of the first planetary gearset (RS1) and the sun gear (SO4) of the fourth planetary gearset (RS4) are connected in a rotationally fixed manner and form the third shaft (3);

the ring gear (HO1) of the first planetary gearset (RS1) forms the fourth shaft (4);

the sun gear (SO2) of the second planetary gearset (RS2) and the sun gear (SO3) of the third planetary gearset (RS3) are coupled to one another and form the fifth shaft (5);

the carrier (ST1) of the first planetary gearset (RS1) and the ring gear (HO3) of the third planetary gearset (RS3) are coupled to one another and form the sixth shaft (6);

the ring gear (HO2) of the second planetary gearset (RS2) and the ring gear (HO4) of the fourth planetary gearset (RS4) are coupled to one another and form the seventh shaft (7); and the carrier (ST2) of the second planetary gearset (RS2) forms the eight shaft (8).

* * * * *